US012809771B2

(12) United States Patent
Kang et al.

(10) Patent No.: US 12,809,771 B2
(45) Date of Patent: Nov. 24, 2026

(54) STORAGE DEVICE AND AN ELECTRONIC SYSTEM INCLUDING THE SAME FOR STORING A PHYSICAL GROUP ADDRESS

(71) Applicant: Samsung Electronics Co., Ltd., Suwon-si (KR)

(72) Inventors: Nam Wook Kang, Suwon-si (KR); Youngjo Park, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 18/627,832

(22) Filed: Apr. 5, 2024

(65) Prior Publication Data

US 2025/0086108 A1 Mar. 13, 2025

(30) Foreign Application Priority Data

Sep. 7, 2023 (KR) ........................ 10-2023-0119106

(51) Int. Cl.
*G06F 12/02* (2006.01)
*G06F 13/16* (2006.01)

(52) U.S. Cl.
CPC ...... *G06F 12/0292* (2013.01); *G06F 12/0246* (2013.01); *G06F 13/1668* (2013.01)

(58) Field of Classification Search
CPC ............. G06F 12/0292; G06F 12/0246; G06F 13/1668; G06F 2212/7201; G06F 12/0646; G06F 3/0658; G06F 12/10
See application file for complete search history.

(56) References Cited

U.S. PATENT DOCUMENTS

| | | | | |
|---|---|---|---|---|
| 7,660,941 | B2 | 2/2010 | Lee et al. | |
| 7,711,923 | B2 | 5/2010 | Rogers et al. | |
| 10,922,240 | B2 | 2/2021 | Onishi et al. | |
| 2007/0204128 | A1* | 8/2007 | Lee | G06F 12/0246 365/185.11 |
| 2007/0300037 | A1 | 12/2007 | Rogers et al. | |
| 2009/0070547 | A1* | 3/2009 | Jeong | G06F 12/0246 711/E12.078 |
| 2014/0052899 | A1 | 2/2014 | Nan | |
| 2014/0325115 | A1* | 10/2014 | Ramsundar | G06F 3/0688 711/163 |

(Continued)

FOREIGN PATENT DOCUMENTS

| | | |
|---|---|---|
| CN | 106547703 B | 5/2019 |
| CN | 108121503 B | 3/2021 |

(Continued)

*Primary Examiner* — Tasnima Matin
(74) *Attorney, Agent, or Firm* — Harness, Dickey & Pierce, P.L.C.

(57) ABSTRACT

A storage device and an electronic system including the same semiconductor device are provided. The storage device includes a non-volatile memory device configured to store data in a data area and metadata corresponding to the data in a spare area distinguished from the data area, and a memory controller configured to perform a translation operation of translating a logical address received from an outside to a physical group address, receive first and second metadata different from each other from the non-volatile memory based on the physical group address, and perform an index check operation of selecting a piece of metadata corresponding to the logical address from the first and second metadata.

20 Claims, 21 Drawing Sheets

(56) References Cited

U.S. PATENT DOCUMENTS

| | | | | |
|---|---|---|---|---|
| 2019/0220396 | A1* | 7/2019 | Lin | G06F 12/0246 |
| 2020/0089617 | A1 | 3/2020 | Onishi et al. | |
| 2021/0365384 | A1* | 11/2021 | Goss | G06F 12/0246 |
| 2022/0050681 | A1* | 2/2022 | Lloyd | G06F 9/30047 |
| 2022/0171569 | A1* | 6/2022 | Um | G06F 3/0688 |
| 2022/0197560 | A1* | 6/2022 | Na | G06F 3/0652 |
| 2022/0197562 | A1* | 6/2022 | Wada | G06F 12/10 |
| 2022/0197815 | A1* | 6/2022 | Cariello | G06F 12/1009 |
| 2023/0046402 | A1* | 2/2023 | Tan | G06F 3/0625 |
| 2023/0051212 | A1* | 2/2023 | Parry | G06F 12/0253 |
| 2024/0176537 | A1* | 5/2024 | Kaneko | G06F 3/0659 |

FOREIGN PATENT DOCUMENTS

| | | | |
|---|---|---|---|
| CN | 112486861 | A | 3/2021 |
| CN | 113419975 | B | 3/2023 |

* cited by examiner

FIG. 3

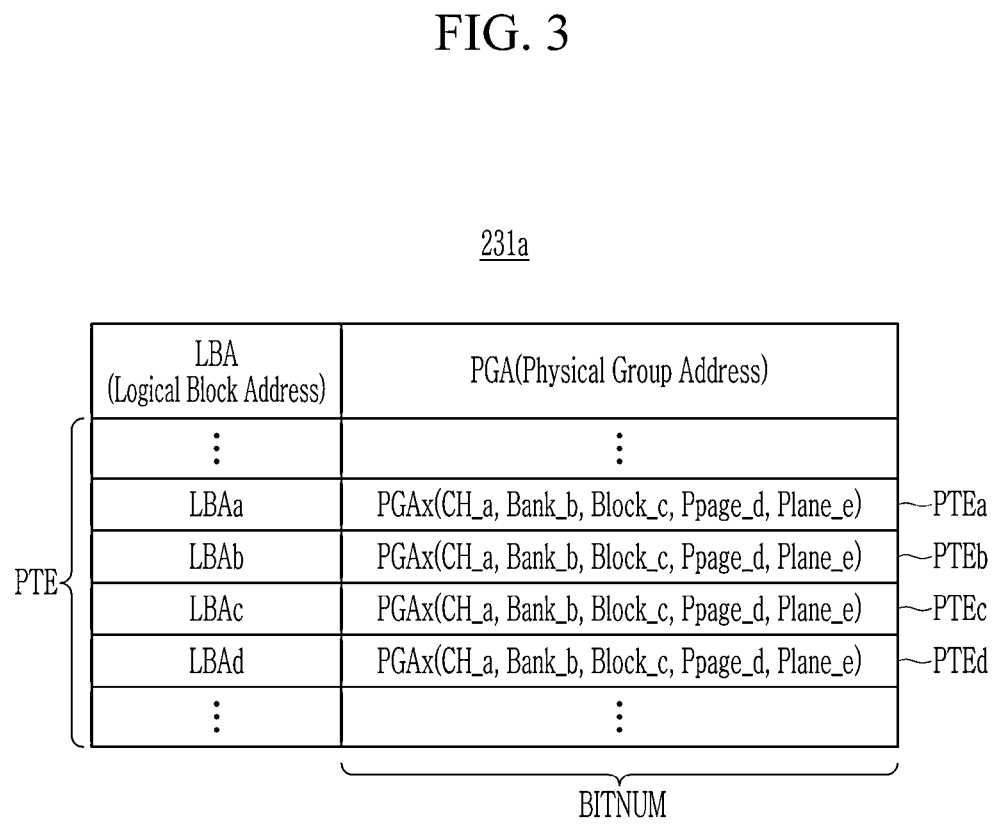

231a

| LBA (Logical Block Address) | PGA(Physical Group Address) | |
|---|---|---|
| ⋮ | ⋮ | |
| LBAa | PGAx(CH_a, Bank_b, Block_c, Ppage_d, Plane_e) | PTEa |
| LBAb | PGAx(CH_a, Bank_b, Block_c, Ppage_d, Plane_e) | PTEb |
| LBAc | PGAx(CH_a, Bank_b, Block_c, Ppage_d, Plane_e) | PTEc |
| LBAd | PGAx(CH_a, Bank_b, Block_c, Ppage_d, Plane_e) | PTEd |
| ⋮ | ⋮ | |

PTE

BITNUM

FIG. 9

231a

PTE

| LBA (Logical Block Address) | PGA(Physical Group Address) | |
|---|---|---|
| ⋮ | ⋮ | |
| LBAa | EMPTY → PGAx(CH_a, Bank_b, Block_c, Ppage_d, Plane_e) | PTEa |
| LBAb | PGAx(CH_a, Bank_b, Block_c, Ppage_d, Plane_e) | PTEb |
| LBAc | PGAx(CH_a, Bank_b, Block_c, Ppage_d, Plane_e) | PTEc |
| LBAd | PGAx(CH_a, Bank_b, Block_c, Ppage_d, Plane_e) | PTEd |
| ⋮ | ⋮ | |

BITNUM

FIG. 20

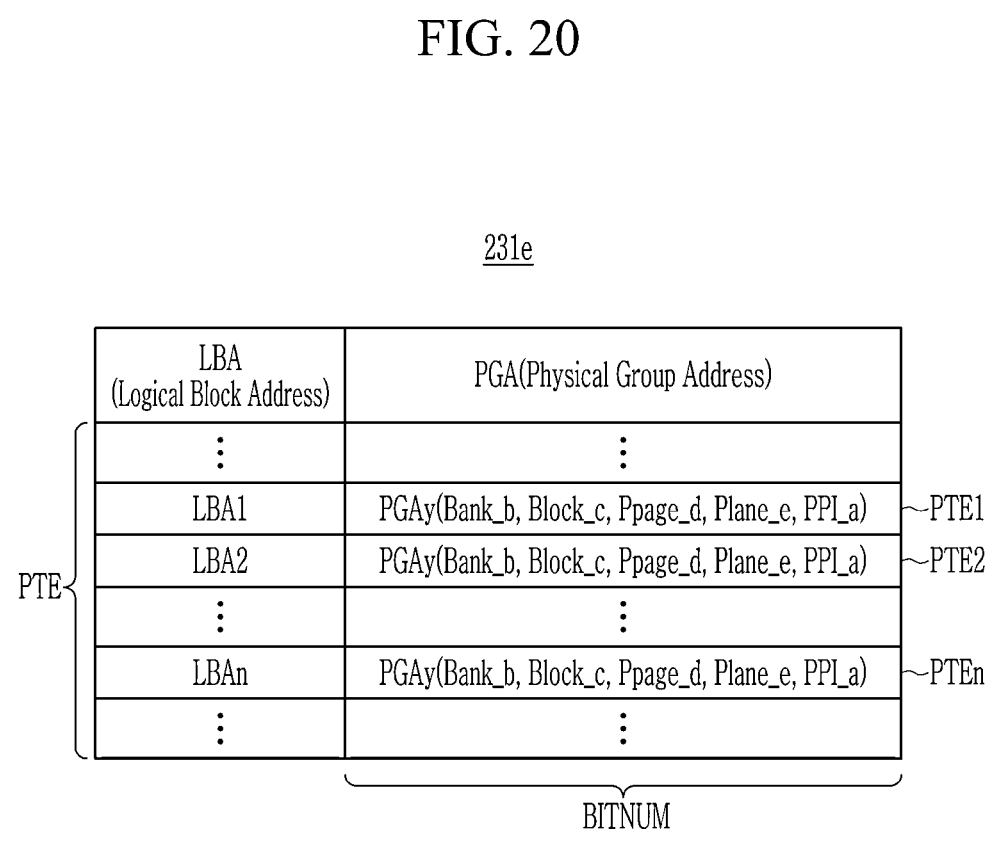

231e

| LBA (Logical Block Address) | PGA(Physical Group Address) | |
|---|---|---|
| ⋮ | ⋮ | |
| LBA1 | PGAy(Bank_b, Block_c, Ppage_d, Plane_e, PPI_a) | PTE1 |
| LBA2 | PGAy(Bank_b, Block_c, Ppage_d, Plane_e, PPI_a) | PTE2 |
| ⋮ | ⋮ | |
| LBAn | PGAy(Bank_b, Block_c, Ppage_d, Plane_e, PPI_a) | PTEn |
| ⋮ | ⋮ | |

PTE

BITNUM

STORAGE DEVICE AND AN ELECTRONIC SYSTEM INCLUDING THE SAME FOR STORING A PHYSICAL GROUP ADDRESS

CROSS-REFERENCE TO RELATED APPLICATION

This application claims priority to and the benefit of Korean Patent Application No. 10-2023-0119106 filed in the Korean Intellectual Property Office on Sep. 7, 2023, the entire contents of which are incorporated herein by reference.

BACKGROUND

(a) Field

The present inventive concepts relate to storage devices and electronic systems including the same storage devices.

(b) Description of the Related Art

In non-volatile memories, even when drive power is not supplied, data recorded in cells are retained without being lost. Among non-volatile memories (NVMs), flash memories are widely used in computers, memory cards, and so on since they allow data in cells to be electrically and collectively erased.

In order to perform a request of an operating system (OS) or a file system for accessing a data storage device based on a flash memory, a flash translation layer (hereinafter, referred to as FTL) may be used between the OS or the file system and the flash memory. The FTL may contain mapping information defining the relationships between logical addresses and the physical addresses of the flash memory. The FTL can use the mapping information to translate logical addresses to physical addresses of the flash memory.

SUMMARY

The present inventive concepts provide storage devices and electronic systems capable of efficiently storing physical addresses.

Some example embodiments may provide a storage device comprising a non-volatile memory device configured to store data in a data area and metadata corresponding to the data in a spare area distinguished from the data area, and a memory controller configured to perform a translation operation of translating a logical address received from an outside to a physical group address, receive first and second metadata different from each other from the non-volatile memory device based on the physical group address, and perform an index check operation of selecting a piece of metadata corresponding to the logical address from the first and second metadata.

Some example embodiments may provide a storage device comprising a non-volatile memory device configured to store first data, first metadata corresponding to the first data, second data different from the first data, and second metadata corresponding to the second data, and a memory controller that includes a flash translation layer containing first mapping information in which a first logical address corresponding to the first metadata and a physical group address are mapped with each other and second mapping information in which a second logical address corresponding to the second metadata and the physical group address are mapped with each other.

Some example embodiments may provide an electronic system comprising a host device configured to send a read command and a logical address, and a storage device configured to receive the read command and the logical address, translate the logical address to a physical group address, read a plurality of logical block addresses stored in advance in association with the physical group address, in response to the read command, and send data corresponding to one logical block address corresponding to the logical address among the plurality of logical block addresses, to the host device.

BRIEF DESCRIPTION OF THE DRAWINGS

FIG. 3 is a view for explaining a mapping table according to some example embodiments.

FIG. 8 and FIG. 9 are views for explaining the operation of the storage device according to some example embodiments.

FIG. 20 is a view for explaining a storage device according to some example embodiments.

DETAILED DESCRIPTION

Figure 1:
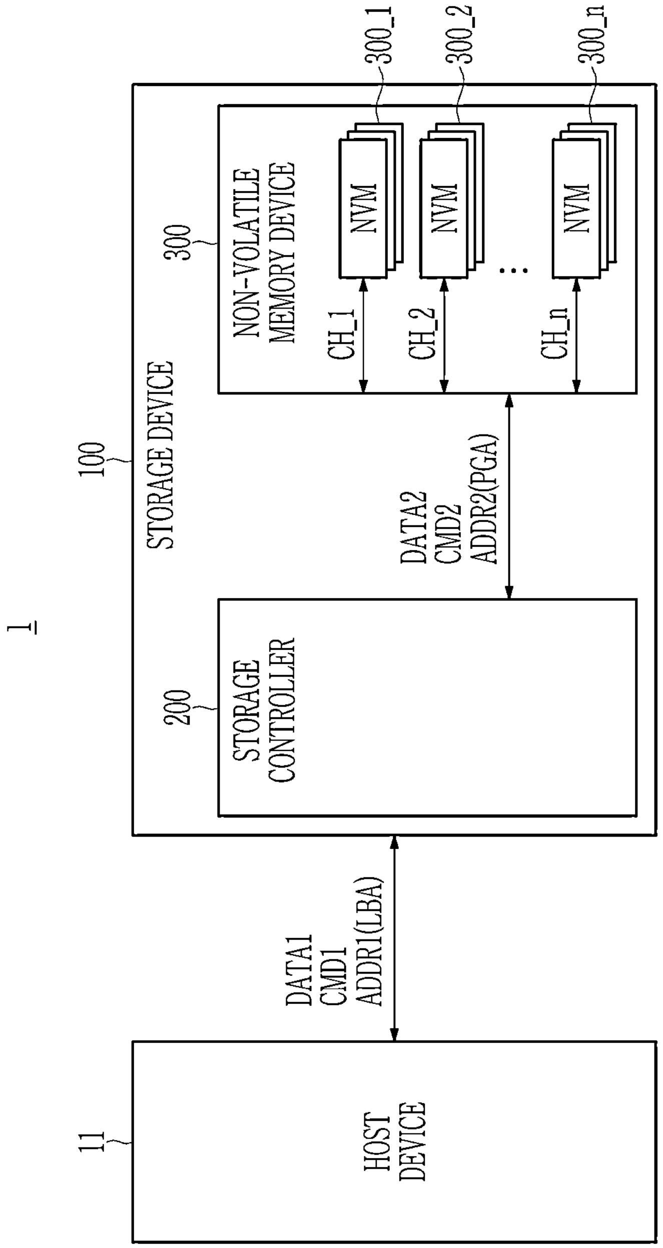
FIG. 1 is a block diagram illustrating an electronic system according to some example embodiments.

In the following detailed description, only certain example embodiments of the present inventive concepts have been shown and described, simply by way of illustration. The present inventive concepts can be variously implemented and is not limited to the following example embodiments.

The drawings and description are to be regarded as illustrative in nature and not restrictive. Like reference numerals designate like elements throughout the specification.

In addition, the size and thickness of each configuration shown in the drawings are arbitrarily shown for understanding and ease of description, but the present inventive concepts are not limited thereto. In the drawings, the thickness of layers, films, panels, regions, etc., are exaggerated for clarity. Further, in the drawings, for understanding and ease of description, the thickness of some layers and areas is exaggerated.

In addition, unless explicitly described to the contrary, the word "comprise," and variations such as "comprises" or "comprising," will be understood to imply the inclusion of stated elements but not the exclusion of any other elements.

FIG. 1 is a block diagram illustrating an electronic system according to some example embodiments.

Referring to FIG. 1, an electronic system 1 includes a host device 11 and a storage device 100.

The host device 11 controls the overall operation of the storage device 100. The host device 11 may run an operating system (OS). For example, the operating system that is run by the host device 11 may include a file system for file management, and device drivers for controlling peripheral devices including the storage device 100 at the level of the operating system. In some example embodiments, the operating system may access the storage device 100 through logical block addresses (LBAs).

The host device 11 may perform communication with the storage device 100 through various interfaces. For example, the host device 11 may perform communication with the storage device 100 through various interfaces such as USB (Universal Serial Bus), MMC (MultiMediaCard), PCI-E (PCI Express), ATA (AT Attachment), SATA (Serial AT Attachment), PATA (Parallel AT Attachment), SCSI (Small Computer System Interface), SAS (Serial Attached SCSI), ESDI (Enhanced Small Disk Interface), IDE (Integrated Drive Electronics), NVMe (Non-Volatile Memory Express), but example embodiments are not limited thereto. The host device 11 may transmit a read request or a write request to the storage device 100, and the storage device 100 may write data in a non-volatile memory device 300 or read data from the non-volatile memory device 300 in response to the write request or the read request.

The host device 11 may be implemented with an AP (application processor) or an SoC (System-on-a-Chip). In some example embodiments, the host device 11 may be implemented with an integrated circuit, a motherboard, or a database server, but example embodiments are not limited thereto.

The storage device 100 may be accessed by the host device 11. The storage device 100 may include a storage controller 200 and a non-volatile memory device 300. The storage device 100 may store data or process data in response to commands from the host device 11. For example, the storage device 100 may be a solid-state drive (SSD), a smart SSD, an embedded multimedia card (eMMC), an embedded universal flash storage (UFS) memory device, a UFS memory card, compact flash (CF), secure digital (SD), micro secure digital (Micro-SD), mini secure digital (Mini-SD), extreme digital (xD), or a memory stick, but example embodiments are not limited thereto.

The storage controller 200 may control the operation of the storage device 100. For example, the storage controller 200 may control the operation of the non-volatile memory device 300 on the basis of a first command CMD1, a first address ADDR1, and first data DATA1 received from the host device 11. In some example embodiments, the storage controller 200 may transmit and receive first data DATA1 in units of a 4-kB logical page to and from the host device 11, reflecting the data size that is supported by the operating system or the file system; however, the size of first data DATA1 is not limited to the above-mentioned example embodiments.

The storage device 100 according to some example embodiments may receive the first address ADDR1 in a logical block address (LBA) form from the host device 11. In some example embodiments, the storage device 100 may receive hash data together with the first address ADDR1 from the host device 11. According to some example embodiments, the hash data is a predetermined number of bits of data indicating location information on subject data, and may be data capable of specifying an address among a group of addresses after translation to a physical group address.

The storage controller 200 may control the non-volatile memory device 300 in response to a request received from the host device 11. The request may contain, for example, a command, an address, data, etc. The storage controller 200 may write data in the non-volatile memory device 300 or read data from the non-volatile memory device 300, in response to a command from the host device 11.

The storage controller 200 may manage and/or control read and write operations on the non-volatile memory device 300 using a second command CMD2, a second address ADDR2, and second data DATA2. In some example embodiments, the storage controller 200 may provide the second address ADDR2 in a physical group address (PGAs) form to the non-volatile memory device 300. A detailed description of a physical group address PGA, according to some example embodiments, will be made when FIG. 3 is described. In the non-volatile memory device 300, a block is a unit of an erase operation.

The non-volatile memory device 300 may include a plurality of non-volatile memories 300_1, 300_2, . . . , **300_*n*. The plurality of non-volatile memories 300_1, 300_2, . . . , 300_*n* may store data. Each of the plurality of non-volatile memories 300_1, 300_2, . . . , 300_*n* may include a memory cell array including non-volatile memory cells capable of retaining stored data even when the electronic system 1** is cut off (e.g., powered off, loses power, etc.), and the memory cell array may be divided into a plurality of memory blocks. The plurality of memory blocks may have a two-dimensional (2D) horizontal structure in which memory cells are disposed two-dimensionally in the same plane (or layer) or a three-dimensional (3D) vertical structure in which non-volatile memory cells are disposed three-dimensionally. The memory cells may be single-level cells (SLCs), each of which stores one bit of data, or may be multi-level cells (MLCs), each of which stores two or more bits of data. However, the memory cells are not limited thereto, and each memory cell may be a triple-level cell (TLC) that stores three bits of data, or a quadruple-level cell that stores four bits of data.

Each of the plurality of non-volatile memories 300_1, 300_2, . . . , **300_*n* may include a plurality of dies or a plurality of chips, each of which includes a memory cell array. For example, the non-volatile memory device 300 may include a plurality of chips, each of which may include a plurality of dies. In some example embodiments, each of the plurality of non-volatile memories 300_1, 300_2, . . . , 300_*n* may also include a plurality of channels CH_1, CH_2, . . . , CH_n including a plurality of chips. The plurality of non-volatile memories 300_1, 300_2, . . . , 300_*n* may be coupled to the storage controller 200 through the plurality of channels CH_1, CH_2, . . . , CH_n, respectively. In some example embodiments, two or more of the plurality of non-volatile memories 300_1, 300_2, . . . , 300_*n* may be coupled to one channel, and the number of non-volatile memories that are coupled to one channel among the plurality of non-volatile memories 300_1, 300_2, . . . , 300_*n*** may be defined by a number of banks.

Each of the plurality of non-volatile memories 300_1, 300_2, . . . , **300_*n* may include a NAND flash memory. In some example embodiments, each of the plurality of non-volatile memories 300_1, 300_2, . . . , 300_*n* may include an EEPROM (Electrically Erasable Programmable Read-Only Memory), a PRAM (Phase Change Random Access Memory), a ReRAM (resistive RAM), an RRAM (Resistance Random Access Memory), an NFGM (Nano Floating Gate Memory), a PoRAM (Polymer Random Access Memory), an MRAM (Magnetic Random Access Memory), an FRAM (Ferroelectric Random Access Memory), or a memory similar thereto, but example embodiments are not limited thereto. The following description of some example embodiments will be made on the assumption that each of the plurality of non-volatile memories 300_1, 300_2, . . . , 300_*n*** in the present inventive concepts is a NAND flash memory device.

In some example embodiments, each storage device 100 may be an SSD (Solid State Drive). In some example embodiments, each storage device 100 may be a UFS (Universal Flash Storage), an MMC (Multi Media Card), or an eMMC (embedded MMC). In some example embodiments, each storage device 100 may be an SD (Secure Digital) card, a micro SD card, a memory stick, a chip card, a USB (Universal Serial Bus) card, a smart card, a CF (Compact Flash) card, or a form similar thereto.

In some example embodiments each storage device 100 may be coupled to the host device 11 through a block accessible interface including a bus such as a serial advanced technology attachment (SATA) bus, a small computer system interface (SCSI) bus, a non-volatile memory express (NVMe) bus, a serial attached SCSI (SAS) bus, a UFS, an eMMC, etc., and may be accessed on a block-by-block basis by the host device 11 through the block accessible interface.

In some example embodiments, the storage device 100 may be any computing system such as a personal computer (PC), a server computer, a data center, a workstation, a digital television, a set-top box, etc. In some example embodiments, the storage device 100 may be any mobile system such as a mobile phone, a smart phone, a tablet, a personal computer (PC), a laptop computer, a personal digital assistant (PDA), a portable multimedia player (PMP), a digital camera, a camcorder, a portable game console, a music player, a video player, a navigation device, a wearable device, an Internet of things (IoT) device, an e-book device, a virtual reality (VR) device, an augmented reality (AR) device, a drone, etc.

Figure 2:
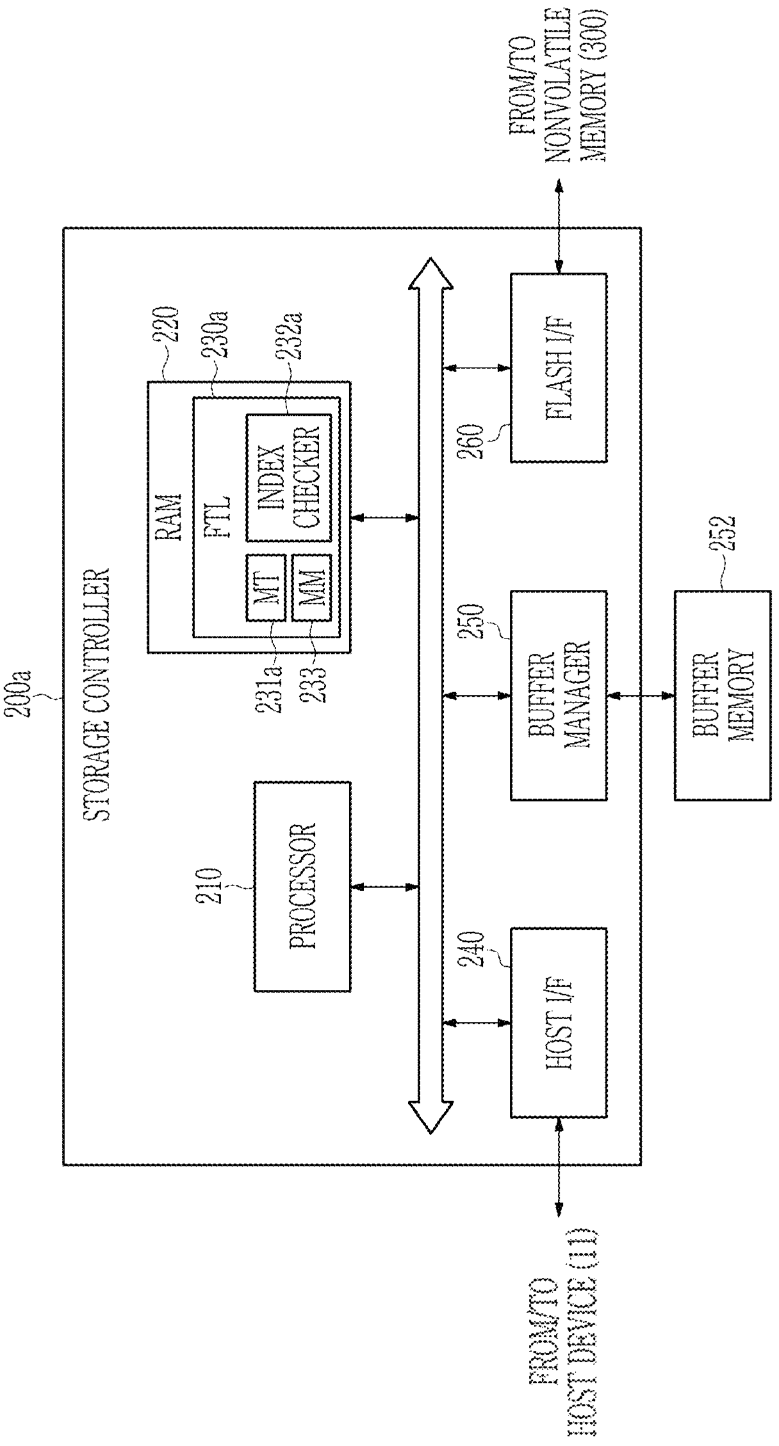
FIG. 2 is a block diagram illustrating a storage controller according to some example embodiments.

FIG. 2 is a block diagram illustrating a storage controller according to some example embodiments, and FIG. 3 is a view for explaining a mapping table according to some example embodiments.

Referring to FIG. 2 and FIG. 3, a storage controller **200*a* may access the non-volatile memory device 300 and a buffer memory 252. The storage controller 200*a* may perform write, read, and erase operations in response to requests from the host device 11. The storage controller 200*a* may write requested data to be written, in the non-volatile memory device 300, and may read requested data from the non-volatile memory device 300** and output them.

The storage controller **200*a* may manage the non-volatile memory device 300, using the buffer memory 252. For example, the storage controller 200*a* may temporarily store data to be written in the non-volatile memory device 300 or data read from the non-volatile memory device 300 in the buffer memory 252**.

The storage controller **200*a* may include a processor 210, a random access memory (hereinafter, referred to as RAM) 220, a host interface circuit 240, a buffer manager 250, and a flash interface circuit 260**.

The processor 210 may control the overall operation of the storage controller **200*a*, and perform logical operations. The processor 210 may perform communication with the host device 11 through the host interface circuit 240, perform communication with the non-volatile memory device 300 through the flash interface circuit 260, and perform communication with the buffer memory 252 through the buffer manager 250. The processor 210 may use the RAM 220 as an operation memory, a cache memory, or a buffer memory to control the non-volatile memory device 300**.

In some example embodiments, RAM 220 may be used as an operation memory, a cache memory, or a buffer memory for the processor 210. For example, RAM 220 may store codes and commands which are executed by the processor 210. For example, RAM 220 may store data which is processed by the processor 210. The RAM 220 may be implemented with, for example, a DRAM or a static RAM (SRAM). In some example embodiments, in RAM 220, an FTL **230*a*** may be stored.

The FTL **230*a* may manage read and write operations on the non-volatile memory device 300. The FTL 230*a* may perform address mapping for interfacing between the non-volatile memory device 300 and the host device 11**, an index check operation, garbage collection, wear leveling, etc.

According to some example embodiments, FTL **230*a* may include a mapping table (MT) 231*a*, an index checker 232*a*, a mapping manager (MM) 233**, etc.

The FTL **230*a* may perform a mapping operation of translating a logical address generated by the operating system or file system of the host device 11 to a physical address of the non-volatile memory device 300 through the mapping table (MT) 231*a***.

Referring to FIG. 3, in some example embodiments, the mapping table (MT) **231*a*** may contain entries, in each of which a logical block address LBA and a physical group address PGA correspond to each other.

Figure 5:
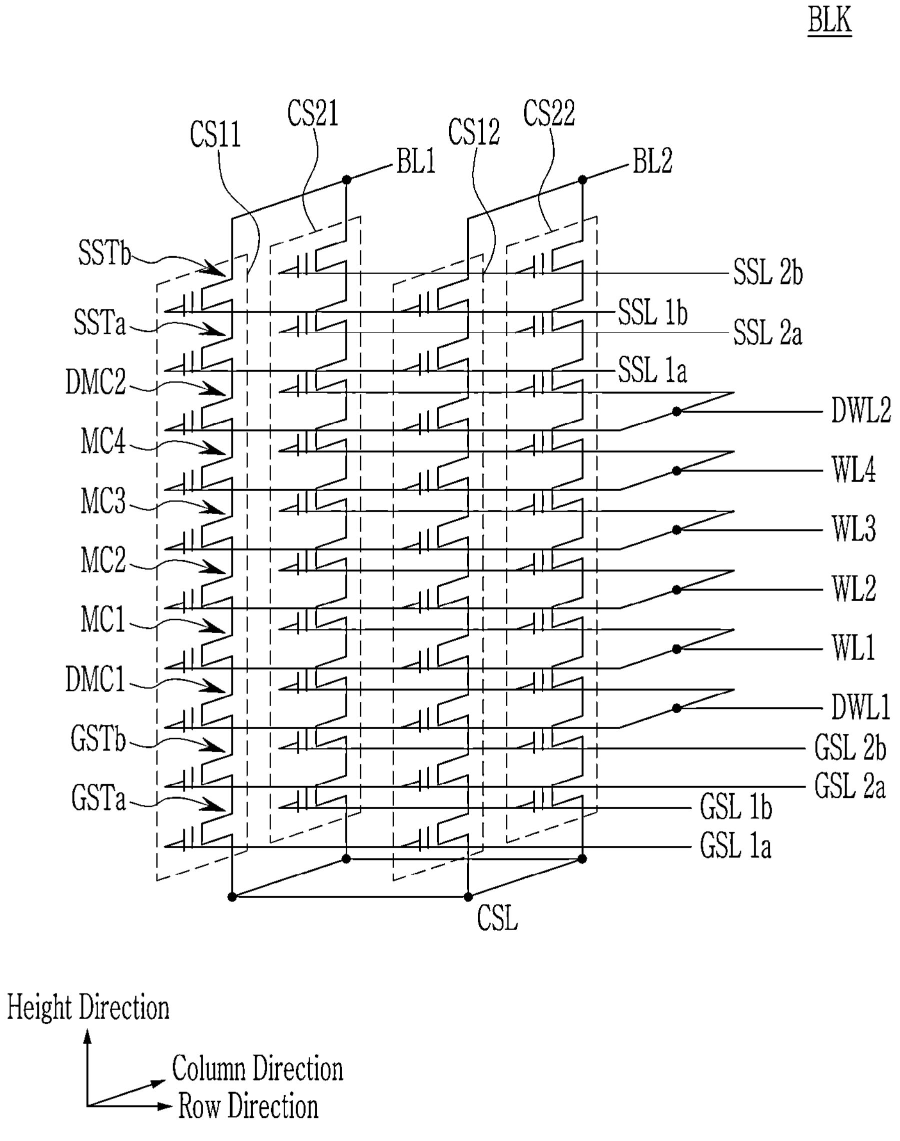
FIG. 5 is a view illustrating a memory block in the memory cell array of FIG. 4.

According to the present inventive concepts, a physical page index PPI is the minimum unit indicating a physical address in the non-volatile memory device 300, and in some example embodiments, the data size corresponding to a physical page index PPI is 4 kB, and the above-mentioned data size may be equal to the data size corresponding to a logical block address LBA. In some example embodiments, physical page indexes PPI may correspond one-to-one with logical block addresses LBA. A detailed description of units of physical addresses other than physical page indexes PPI will be made when FIG. 5 is described. In some example embodiments, one physical group address PGA may contain information on a plurality of physical page indexes PPI.

The mapping table (MT) **231*a*** may contain a plurality of entries PTE. Each of the plurality of entries PTE may contain mapping information on the correspondence relationship between a logical block address LBA and a physical group address PGA. The plurality of entries PTE may include a-th to d-th entries PTEa to PTEd.

The a-th entry PTEa may contain mapping information making an a-th logical block address LBAa and an x-th physical group address PGAx correspond to each other. The x-th physical group address PGAx may contain information on an a-th channel CH_a in the non-volatile memory device 300, information on a b-th bank Bank_b, information on a c-th block Block_c, information on a d-th physical page Ppage_d, and information on an e-th plane Plane_e. The a-th channel CH_a may correspond to one of the plurality of channels CH_1, CH_2, . . . , CH_n illustrated in FIG. 1.

The b-th entry PTEb may contain mapping information making an b-th logical block address LBAb and the x-th physical group address PGAx correspond to each other. The c-th entry PTEc may contain mapping information making a c-th logical block address LBAc and the x-th physical group address PGAx correspond to each other. The d-th entry PTEd may contain mapping information making a d-th logical block address LBAd and the x-th physical group address PGAx correspond to each other.

In some example embodiments, a logical block address LBA may be translated to a logical page number LPN by FTL 230*a*, such that the logical block address LBA can be stored in the logical page number LPN form in the mapping table (MT) 231*a*. In some example embodiments, when the data unit corresponding to a logical block address LBA is 512 bytes, and the data size corresponding to a physical page index (hereinafter, referred to as PPI) of the non-volatile memory device 300 is 4 kB, eight logical block addresses LBA may be configured for one logical page number LPN.

The x-th physical group address PGAx according to some example embodiments may have a one-to-many relationship with the a-th to d-th logical block addresses LBAa to LBAd, each corresponding to the minimum physical address unit. Accordingly, the number of entries in the mapping table (MT) 231*a* according to some example embodiments may be determined depending on the number of logical block addresses LBAs.

The x-th physical group address PGAx illustrated in FIG. 3 may be assigned to a group set in the unit of a plane, and may have a one-to-many relationship with a plurality of minimum physical address units. Accordingly, in some example embodiments, the number of bits (BITNUM) that are assigned to the x-th physical group address PGAx in the mapping information may be smaller than the number of bits representing a minimum physical address unit. In some example embodiments, the number of bits (BITNUM) that are assigned to the x-th physical group address PGAx may be 30 bits; however, depending on address group settings according to some example embodiments, the number of bits (BITNUM) that are assigned to the x-th physical group address PGAx may be smaller. In some example embodiments, address groups may be set in various units such as in the units of a channel, a bank, a block, a page, etc.

In some example embodiments, the smaller number of bits may cause the data size of the overall mapping table (MT) 231*a* containing the mapping information to decrease, resulting in a decrease in the amount of usage of the RAM 220 for loading the mapping table (MT) 231*a*.

In some example embodiments, FTL 230*a* may perform an index check operation through the index checker 232*a* to select data to be read from among a plurality of data corresponding to a physical group address PGA. FTL 230*a*, according to some example embodiments, may compare a logical block address LBA or hash data provided from the host device 11 with a plurality of metadata provided from the non-volatile memory device 300. In some example embodiments, the plurality of metadata may correspond to a physical group address PGA. Depending on the comparison result, FTL 230*a* may perform an index check operation of selecting metadata that matches the logical block address LBA or the hash data. In some example embodiments, the metadata may include a logical block address or hash data. Thereafter, the storage controller 200*a* may provide a read command for the selected data to the non-volatile memory device 300.

The metadata according to some example embodiments may contain a logical block address LBA, and FTL 230*a* may check whether the logical block address LBA provided from the host device 11 and the logical block address LBA contained in the metadata match each other. FTL 230*a* may select metadata containing the matched logical block address LBA, and the storage controller 200*a* may provide a read command for data corresponding to the selected metadata to the non-volatile memory device 300.

In some example embodiments, FTL 230*a* may receive a fixed number of bits of hash data together with the logical block address LBA from the host device 11, and may check whether the hash data received from the host device 11 and the hash data contained in the metadata match each other. When the hash data received from the host device 11 and the hash data contained in the metadata match each other, FTL 230*a* may provide a read command for data corresponding to the metadata to the non-volatile memory device 300.

In some example embodiments, FTL 230*a* may receive a plurality of metadata consecutively or simultaneously. After receiving the plurality of metadata, FTL 230*a* may perform a check operation on the plurality of metadata.

In some example embodiments, after performing an index check operation on one piece of metadata, FTL 230*a* may receive another piece of metadata. When FTL 230*a* selects the metadata matching the logical block address LBA provided from the host device 11 by performing the check operation on the metadata, thereafter, if any new command is not input, metadata corresponding to the physical group address PGA may not be provided from the non-volatile memory device 300 to FTL 230*a*.

In some example embodiments, the FTL 230*a* provides interfacing for hiding erase operations on the non-volatile memory device 300, between the file system or operating system of the host device 11 and the non-volatile memory device 300. For example, when the FTL 230*a* receives an overwrite request from the host device 11, it may not overwrite the designated page with the corresponding data, but may instead write it in another blank page, thereby serving to reduce additional page copy and erase operations. While the FTL 230*a* reduces unnecessary read, write, and erase operations accompanied with overwriting, it may result in a number of pages retaining old data rather than the latest data (invalidated pages). To reduce or prevent the storage space of the non-volatile memory device 300 from being wasted due to invalidated pages, the FTL 230*a* may periodically perform garbage collection to delete invalidated pages, and may also perform wear leveling.

The mapping manager (MM) 233 may change physical addresses corresponding to logical addresses in the entries PTE of the mapping table (MT) 231*a*, depending on the results of operations on the non-volatile memory device 300, such as write operations, garbage collection, wear leveling, etc.

The host interface circuit 240 is configured to perform communication with an external host device under the control of the processor 210. The host interface circuit 240 may be configured to perform communication using at least one of various communication systems such as USB (Universal Serial Bus), SATA (Serial AT Attachment), SAS (Serial Attached SCSI), HSIC (High Speed Interchip), SCSI (Small Computer System Interface), PCI (Peripheral Component Interconnection), PCIe (PCI express), NVMe (Non-Volatile Memory express), UFS (Universal Flash Storage), SD (Secure Digital), MMC (MultiMedia Card), eMMC (embedded MMC), DIMM (Dual In-line Memory Module), RDIMM (Registered DIMM), LRDIMM (Load Reduced DIMM), etc., but example embodiments are not limited thereto.

The buffer manager 250 is configured to control the buffer memory 252 under the control of the processor 210. The buffer manager 250 controls the buffer memory 252 such that the buffer memory temporarily stores data to be exchanged between the non-volatile memory device 300 and the host device 11. The buffer memory 252 may store commands and data which are executed and processed by the storage controller 200*a*. The buffer memory 252 may temporarily store data read from the non-volatile memory device 300 or data to be stored in the non-volatile memory device.

The buffer memory 252 may be implemented with a volatile memory such as a dynamic random access memory (DRAM), a static RAM (SRAM), etc., but example embodiments are not limited thereto. For example, the buffer memory 252 may be implemented with various non-volatile memories, for example, resistive non-volatile memories such as a magnetic RAM (MRAM), a phase change RAM (PRAM), or a resistive RAM (ReRAM), a flash memory, a nano floating gate memory (NFGM), a polymer random access memory (PoRAM), or a ferroelectric random access memory (FRAM). In some example embodiments, it is shown in the drawings that the buffer memory 252 is provided outside the storage controller 200*a*; however, the buffer memory 252 is not limited thereto, and, in some example embodiments, the buffer memory 252 may be provided inside the storage controller 200*a*.

The flash interface circuit 260 is configured to perform communication with the non-volatile memory device 300 under the control of the processor 210. The flash interface circuit 260 may perform communication with the non-volatile memory device 300 through a plurality of channels. Specifically, the flash interface circuit 260 may transmit and receive commands, addresses, data, and metadata to and from the non-volatile memory device 300 through a plurality of channels. The non-volatile memory device 300 may perform write operations, read operations, and erase operations under the control of the storage controller 200*a*. The non-volatile memory device 300 may receive a write command, an address, and data from the storage controller 200*a* and write the data in a storage space identified by the address. The non-volatile memory device 300 may receive a read command and an address from the storage controller 200*a*, read data from a storage space identified by the address, and output the read data to the storage controller 200*a*. The non-volatile memory device 300 may receive an erase command and an address from the storage controller 200*a* and erase data in a storage space indicated by the address.

Figure 4:
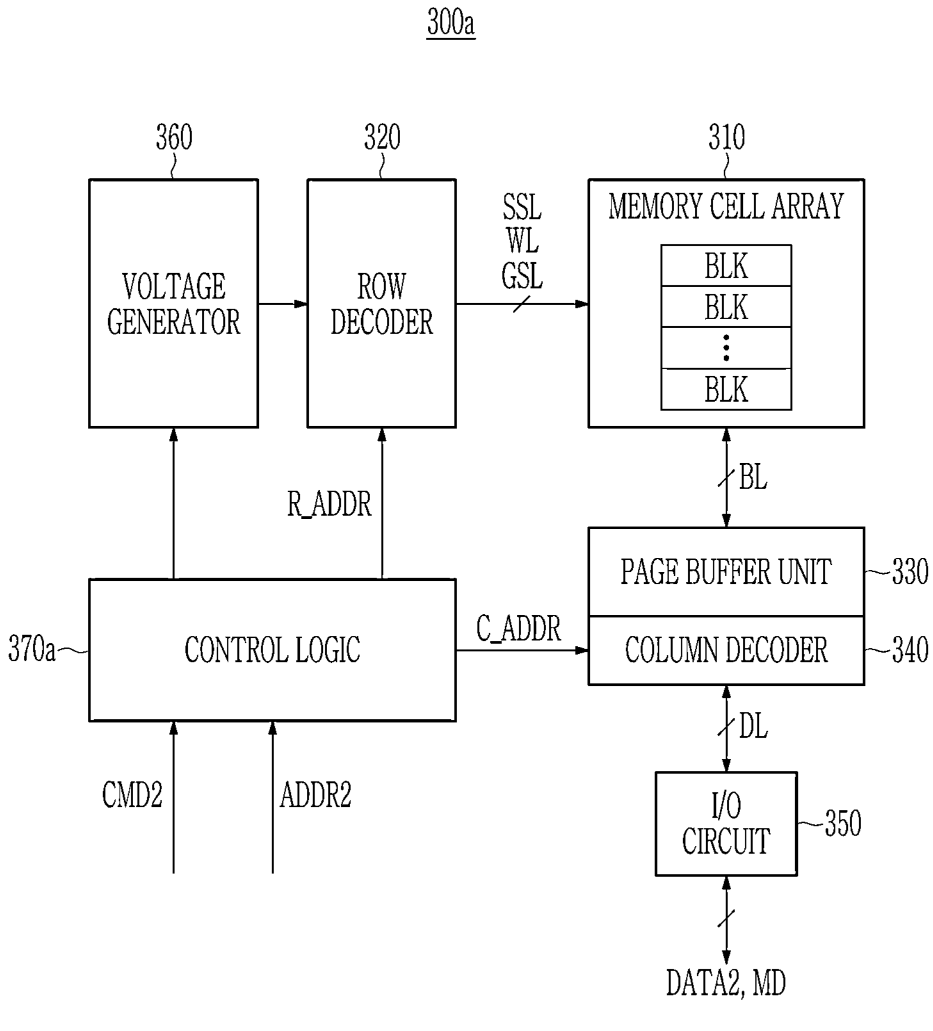
FIG. 4 is a block diagram illustrating an example of a non-volatile memory device according to some example embodiments.

FIG. 4 is a block diagram illustrating an example of a non-volatile memory device according to some example embodiments. FIG. 5 is a view illustrating a memory block in the memory cell array of FIG. 4. Referring to FIG. 1, FIG. 4, and FIG. 5, a non-volatile memory device 300*a* may perform communication with the storage controller 200*a*. The non-volatile memory device 300*a* in FIG. 4 may correspond to one of the plurality of non-volatile memories 300_1, 300_2, . . . , **300_*n* in FIG. 1. For example, the non-volatile memory device 300***a* may receive a second address ADDR2 and a second command CMD2 from the storage controller 200*a*. The non-volatile memory device 300*a* may transmit and receive second data DATA2 to and from the storage controller 200*a*.

The non-volatile memory device 300*a* may include a memory cell array 310, a row decoder 320, a page buffer unit 330, a column decoder 340, a I/O circuit 350, a voltage generator 360, and a control logic 370*a*.

The control logic 370*a* may receive a second command CMD2 and a second address ADDR2 from the storage controller 200*a*. The second command CMD2 may be a signal to instruct an operation such as read, write, erase, or the like to be performed on the non-volatile memory device 300*a*.

The address ADDR2 may include a row address R_ADDR and a column address C_ADDR. In some example embodiments, the control logic 370*a* may control the overall operation of the non-volatile memory device 300*a* on the basis of the second command CMD2 and the second address ADDR2. The second address ADDR2 may include a physical group address PGA, for example, as illustrated in FIG. 3 or a physical address corresponding to metadata selected by the FTL 230*a* in FIG. 2, depending on the operation of the storage controller 200*a*. The control logic 370*a* may generate a row address R_ADDR and a column address C_ADDR based on the second address ADDR2.

In some example embodiments, the control logic 370*a* may manage the second command CMD2 on the basis of the operation of the storage controller 200*a*.

For example, when the storage controller 200*a* provides a second address ADDR2 according to a physical group address PGA, the control logic 370*a* may sequentially provide a plurality of metadata MD corresponding to the physical group address to the storage controller 200*a* through the I/O circuit 350.

In some example embodiments, the voltage generator 360 may control voltages to be applied to the memory cell array 310 through the row decoder 320, under the control of the control logic 370*a*.

The row decoder 320 may receive a row address R_ADDR from the control logic 370*a*. The row decoder 320 may be coupled to the memory cell array 310 through string selection lines SSL, word lines WL, and ground selection lines GSL. The row decoder 320 may decode the row address R_ADDR, and control voltages to be applied to the string selection lines SSL, the word lines WL, and the ground selection lines GSL, on the basis of the decoding result and a voltage received from the voltage generator 360.

The memory cell array 310 may include a plurality of memory blocks BLK. Each of the plurality of memory blocks BLK may have a structure similar to that of the memory block BLK shown in FIG. 5. The memory block BLK shown in FIG. 5 may be the physical erase unit of the non-volatile memory device 300*a*; however, the present inventive concepts are not limited thereto, and the physical erase unit may be changed to a page unit, a word line unit, a sub block unit, etc.

As shown in FIG. 5, in some example embodiments, the memory block BLK may include a plurality of cell strings CS11, CS12, CS21, and CS22.

The plurality of cell strings CS11, CS12, CS21, and CS22 may be arranged in the row direction and the column direction. FIG. 5 shows four cell strings CS11, CS12, CS21, and CS22 for simplicity of the drawing; however, the present inventive concepts are not limited thereto, and the number of cell strings may be increased or decreased in the row direction and the column direction.

Among the plurality of cell strings CS11, CS12, CS21, and CS22, cell strings positioned in the same column may be coupled to the same bit line. For example, the cell strings CS11 and CS21 may be coupled to a first bit line BL1, and the cell strings CS12 and CS22 may be coupled to a second bit line BL2. Each of the plurality of cell strings CS11, CS12, CS21, and CS22 may include a plurality of cell transistors. Each of the plurality of cell transistors may be a charge trap flash (CTF) memory cell. The plurality of cell transistors may be stacked in a height direction which is a direction perpendicular to a plane (for example, a semiconductor substrate (not shown in the drawing) formed by the row direction and the column direction.

The plurality of cell transistors may be coupled in series between the corresponding bit line (for example, BL1 or BL2) and a common source line CSL. For example, the plurality of cell transistors may include string selection transistors SSTb and SSTa, dummy memory cells DMC1 and DMC2, memory cells MC1 to MC4, and ground selection transistors GSTa and GSTb. The string selection transistors SSTb and SSTa coupled in series may be provided between the memory cells MC1 to MC4 coupled in series and the corresponding lines (for example, BL1 or BL2). The ground selection transistors GSTa and GSTb coupled in series may be provided between the memory cells MC1 to MC4 coupled in series and the common source line CSL.

In some example embodiments, between the string selection transistors SSTb and SSTa coupled in series and the memory cells MC1 to MC4 coupled in series, the second dummy memory cell DMC2 may be provided, and between the memory cells MC1 to MC4 coupled in series and the ground selection transistors GSTa and GSTb coupled in series, the first dummy memory cell DMC1 may be provided.

In some example embodiments, among the memory cells MC1 to MC4 of the plurality of cell strings CS11, CS12, CS21, and CS22, the memory cells positioned at the same height may share the same word line with one another. For example, the first memory cells MC1 of the plurality of cell strings CS11, CS12, CS21, and CS22 may be positioned at the same height from the substrate (not shown in the drawing), and may share a first word line WL1. The second memory cells MC2 of the plurality of cell strings CS11, CS12, CS21, and CS22 may be positioned at the same height from the substrate (not shown in the drawing), and may share a second word line WL2. Similarly, the third memory cells MC3 and fourth memory cells MC4 of the plurality of cell strings CS11, CS12, CS21, and CS22 may be positioned at the same heights from the substrate (not shown in the drawing) and may share a third word line WL3 and a fourth word line WL4, respectively.

In some example embodiments, among the dummy memory cells DMC1 and DMC2 of the plurality of cell strings CS11, CS12, CS21, and CS22, dummy memory cells positioned at the same height may share the same dummy word line with one another. For example, the first dummy memory cells DMC1 of the plurality of cell strings CS11, CS12, CS21, and CS22 may share a first dummy word line DWL1, and the second dummy memory cells DMC2 of the plurality of cell strings CS11, CS12, CS21, and CS22 may share a second dummy word line DWL2.

In some example embodiments, among the string selection transistors SSTb and SSTa of the plurality of cell strings CS11, CS12, CS21, and CS22, string selection transistors positioned in the same row and at the same height may be coupled to the same string select line. For example, the string selection transistors SSTb of the cell strings CS11 and CS12 may be coupled to a string selection line SSL1*b*, and the string selection transistors SSTa of the cell strings CS11 and CS12 may be coupled to a string selection line SSL1*a*. The string selection transistors SSTb of the cell strings CS21 and CS22 may be coupled to a string selection line SSL2*b*, and the string selection transistors SSTa of the cell strings CS21 and CS22 may be coupled to a string selection line SSL2*a*.

In some example embodiments, among the ground selection transistors GSTa and GSTb of the plurality of cell strings CS11, CS12, CS21, and CS22, ground selection transistors positioned in the same row and at the same height may be coupled to the same ground selection line. For example, the ground selection transistors GSTb of the cell strings CS11 and CS12 may be coupled to a ground selection line GSL1*b*, and the ground selection transistors GSTa of the cell strings CS11 and CS12 may be coupled to a ground selection line GSL1*a*. The ground selection transistors GSTb of the cell strings CS21 and CS22 may be coupled to a ground selection line GSL2*b*, and the ground selection transistors GSTa of the cell strings CS21 and CS22 may be coupled to a ground selection line GSL2*a*.

In some example embodiments, the memory block BLK shown in FIG. 5 is an example, and the number of cell strings may be increased or decreased, and depending on the number of cell strings, the numbers of rows and columns that constitute the cell strings may be increased or decreased. Further, each of the numbers of cell transistors in the memory blocks BLK may be increased or decreased, and depending on the numbers of cell transistors, the height of the memory blocks BLK may increase or decrease, and depending on the numbers of cell transistors, the numbers of lines that are coupled to the cell transistors may increase or decrease.

In some example embodiments, the memory block BLK may include a plurality of memory pages. For example, the first memory cells MC1 of the cell strings CS11, CS12, CS21, and CS22 coupled to the first word line WL1 may be referred to as a first physical page.

In some example embodiments, one memory page may include memory cells which are included in different planes. A plurality of memory cells (or memory blocks) which are included in the same plane may share the same bit line. For example, the cell strings CS11 and CS21 coupled to the first bit line BL1 may be included in the same plane. Further, among the first memory cells MC1 coupled to the first word line WL1, first memory cells MC1 included in the cell strings CS11 and CS21 may be included in a first plane, and among the first memory cells MC1 coupled to the first word line WL1, first memory cells MC1 of the other cell strings CS12 and CS22 may be included in a second plane. For example, the first memory cells MC1 of the cell strings CS11 and CS21 that are coupled to the first word line WL1 and are coupled to the first bit line BL1 may be referred to as a first physical page and a first plane.

In some example embodiments, one plane may include memory cells included in different physical page indexes PPI. In some example embodiments, the data size corresponding to the physical page indexes PPI may be equal to the data size corresponding to physical pages of the operating system that is executed in the host device 11.

Referring to FIG. 1 and FIG. 4 again, in some example embodiments, the page buffer unit 330 may include a plurality of page buffers. The page buffer unit 330 may be coupled to the memory cell array 310 through bit lines BL. The page buffer unit 330 may read data on a page-by-page basis from the memory cell array 310 by sensing the voltages of the bit lines BL.

The column decoder 340 may receive a column address C_ADDR from the control logic 370*a*. The column decoder 340 may decode the column address C_ADDR and provide data read on the basis of the decoding result by the page buffer unit 330, to the I/O circuit 350.

The column decoder 340 may receive second data DATA2 from the I/O circuit 350 through data lines DL. The column decoder 340 may receive a column address C_ADDR from the control logic 370*a*. The column decoder 340 may decode the column address C_ADDR, and provide the data received from the I/O circuit 350, to the page buffer unit 330, on the basis of the decoding result.

The page buffer unit 330 may store the data provided from the I/O circuit 350, on a page-by-page basis, in the memory cell array 310 through the bit lines BL.

The I/O circuit 350 may be coupled to the column decoder 340 through the data lines DL. The I/O circuit 350 may transfer second data DATA2 received from the storage controller 200*a* to the column decoder 340 through the data lines DL. The I/O circuit 350 may output metadata MD and second data DATA2 received through the data lines DL, to the storage controller 200*a*.

In some example embodiments, a second address ADDR2, a second command CMD2, and second data DATA2 may be transmitted and received through the flash interface circuit 260 illustrated in FIG. 2.

Figure 6:
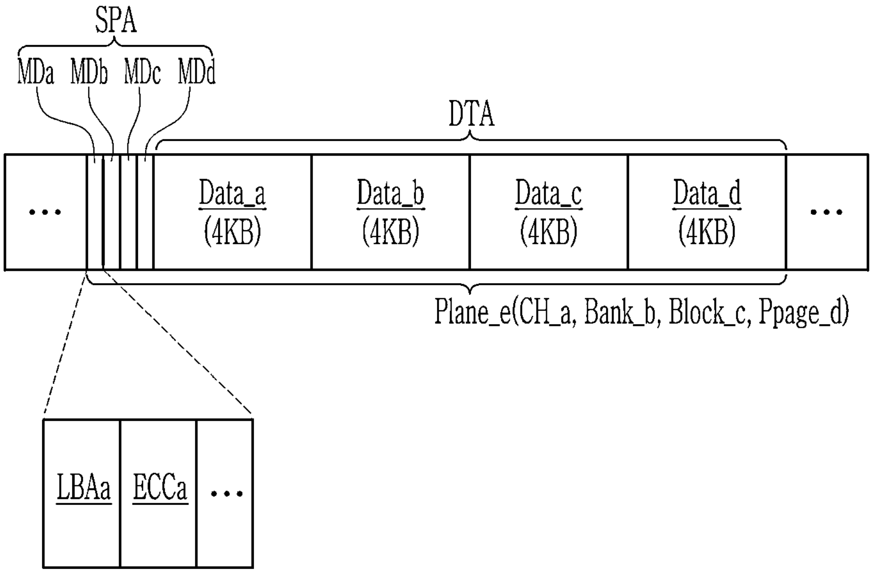
FIG. 6 is a view visually illustrating data stored in a non-volatile memory device according to some example embodiments.

FIG. 6 is a view visually illustrating data stored in a non-volatile memory device according to some example embodiments. FIG. 6 shows a layout example of data stored in one plane in a physical page of the non-volatile memory device.

Referring to FIG. 3, FIG. 4, and FIG. 6, the non-volatile memory device 300*a* may include physical memory cells in a-th channel CH_a, the b-th bank Bank_b, the c-th block Block_c, the d-th physical page Ppage_d, and the e-th plane Plane_e. Memory cells corresponding to the e-th plane Plane_e may store a-th to d-th metadata MDa to MDd and a-th to d-th data Data_a to Data_d corresponding to the a-th to d-th metadata MDa to MDd. The physical addresses of the above-mentioned memory cells are merely an example, and the example of the physical addresses does not limit the technical idea of the present inventive concepts.

The a-th to d-th metadata MDa to MDd may contain accumulated records of the a-th to d-th data Data_a to Data_d that are subjects. The a-th to d-th metadata MDa to MDd may contain information such as the number of times of erase/read, aging, drift parameters, estimated or measured wear, etc., but example embodiments are not limited thereto. For example, the a-th to d-th metadata MDa to MDd may contain user data of the a-th to d-th data Data_a to Data_d which are subjects, the associated memory locations, and the associated state information.

In some example embodiments, the a-th to d-th metadata MDa to MDd may contain the logical block addresses LBA and ECC (error correction code) data of the a-th to d-th data Data_a to Data_d. The ECC data is data to aid a read operation on data that is read again from the memory cell array 310, and allows facilitating detection and/or correction of bit errors.

For example, the a-th metadata MDa may include the a-th logical block address LBAa and an a-th ECC data ECCa corresponding the a-th data Data_a. The a-th logical block address LBAa may correspond to information on the logical address of the a-th data Data_a which is the subject of the a-th metadata MDa, and the a-th ECC data ECCa may contain bit error information of the a-th data Data_a which is the subject of the a-th metadata MDa. The description of the a-th metadata MDa may be applied to the rest of the a-th to d-th metadata Mda to MDd.

The data size of each of the a-th to d-th data Data_a to Data_d may be 4 kB, and this size may be equal to the data size corresponding to the logical block addresses LBA which are processed by the operating system; however, the data size of the a-th to d-th data Data_a to Data_d is not limited to the above-mentioned example embodiment.

In some example embodiments, the a-th to d-th metadata MDa to MDd may be sequentially written in a spare area SPA, and the a-th to d-th data Data_a to Data_d corresponding to the a-th to d-th metadata MDa to MDd may be sequentially written in a data area DTA adjacent to and distinguished from the spare area SPA.

Accordingly, when the non-volatile memory device 300*a* performs a sequential read operation on the e-th plane Plane_e, the a-th to d-th metadata MDa to MDd and the a-th to d-th data Data_a to Data_d may be provided to the storage controller 200*a* in FIG. 2, in the above-mentioned order in which they were written.

Figure 7:
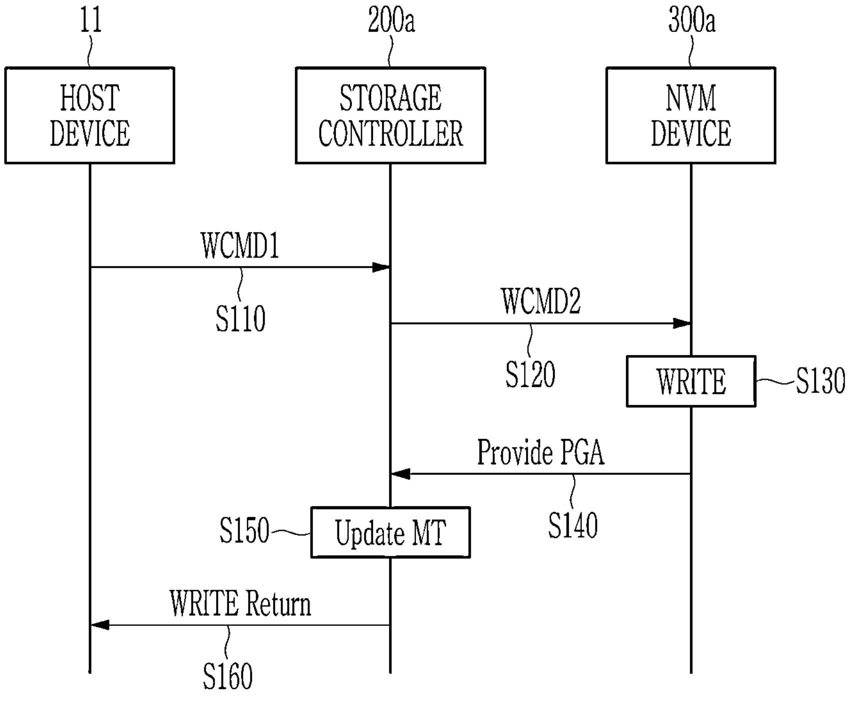
FIG. 7 is a ladder diagram for explaining an operation of the storage device according to some example embodiments.
Figure 8:
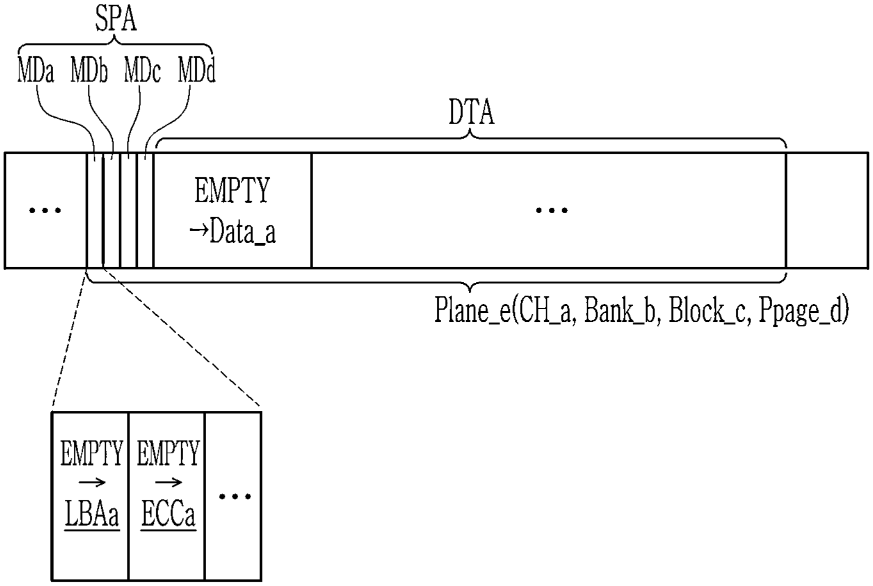

FIG. 7 is a ladder diagram for explaining an operation of the storage device according to some example embodiments. FIG. 8 and FIG. 9 are views for explaining the operation of the storage device according to some example embodiments. FIG. 7 to FIG. 9 are views for explaining a write operation on the storage device according to some example embodiments.

Referring to FIG. 1, and FIG. 7 to FIG. 9, the host device 11 provides a first write command WCMD1 to the storage controller 200*a* (S110).

During a write operation on the storage device 100, the host device 11 may provide a first address ADDR1, an a-th logical block address LBAa corresponding to first data DATA1, and a-th data Data_a, together with a first write command WCMD1 corresponding to a first command CMD1, to the storage controller 200*a*.

On the basis of the first write command WCMD1, the storage controller 200*a* provides a second write command WCMD2 to the non-volatile memory (NVM) device 300*a* (S120).

During the write operation on the storage device 100, the storage controller 200*a* may provide a second address ADDR2, an a-th logical block address LBAa corresponding to second data DATA2, and an a-th data Data_a, together with the second write command WCMD2 corresponding to a second command CMD2, to the non-volatile memory (NVM) device 300*a*.

The non-volatile memory (NVM) device 300*a* performs the write operation based on the a-th logical block address LBAa and the a-th data Data_a (S130).

For example, the non-volatile memory device 300*a* may store the a-th logical block address LBAa and the a-th data Data_a in the e-th plane Plane_e as illustrated in, for example, FIG. 6.

The non-volatile memory (NVM) device 300*a* may store a-th metadata containing the a-th logical block address LBAa and an a-th ECC data ECCa, in an empty area in a spare area SPA of the e-th plane Plane_e.

The non-volatile memory (NVM) device 300*a* may store the a-th data Data_a in an empty area in a data area DTA of the e-th plane Plane_e.

After the write operation, the non-volatile memory device 300*a* provides the physical group address PGA on which the write operation has been performed, to the storage controller 200*a* (S140).

For example, after performing an operation of writing the a-th data Data_a and the a-th metadata MDa illustrated in, for example, FIG. 8, the non-volatile memory (NVM) device 300*a* may provide an x-th physical group address PGAx containing information on the a-th channel CH_a, the b-th bank Bank_b, the c-th block Block_c, the d-th physical page Ppage_d, and the e-th plane Plane_e, to the storage controller 200*a*.

The storage controller 200*a* updates the mapping table (MT) 231*a* on the basis of the physical group address PGA (S150).

The FTL 230*a* in FIG. 2 may perform an operation of updating the a-th entry PTEa through the mapping manager (MM) (reference symbol "233" in FIG. 2). Through the updating operation, the a-th entry PTEa may contain mapping information making the a-th logical block address LBAa and the x-th physical group address PGAx correspond to each other.

The storage controller 200*a* provides a write return signal to the host device 11, depending on the result of the write operation (S160).

Figure 10:
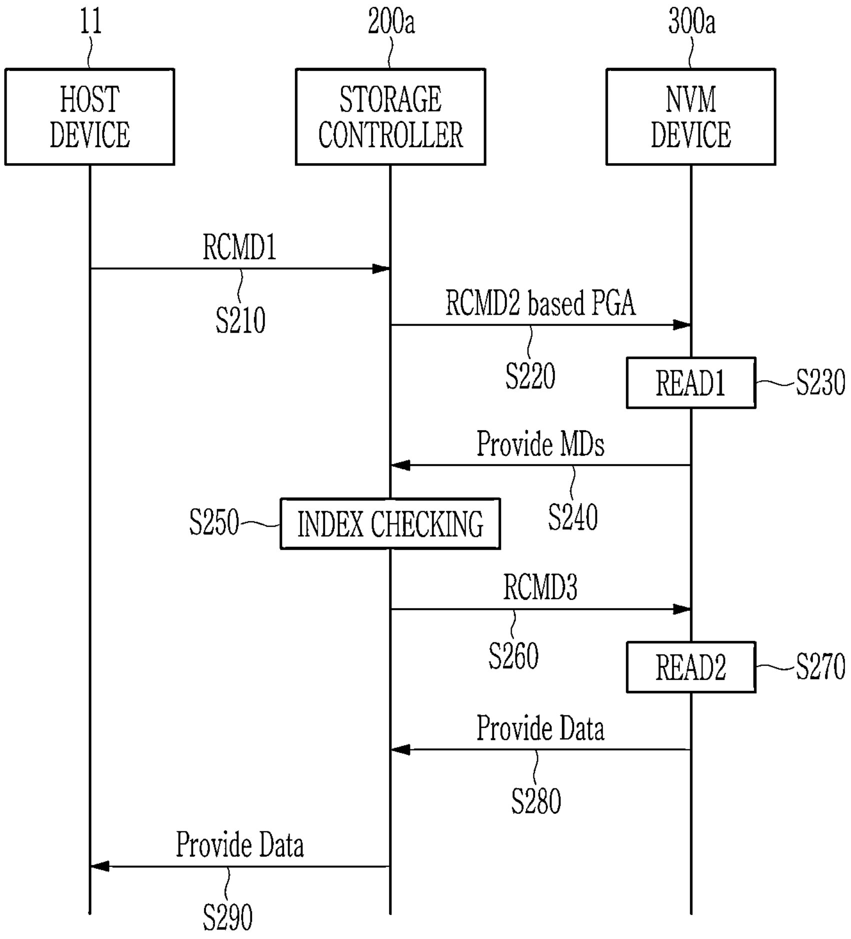
FIG. 10 is a ladder diagram for explaining an operation of the storage device according to some example embodiments.
Figure 11:
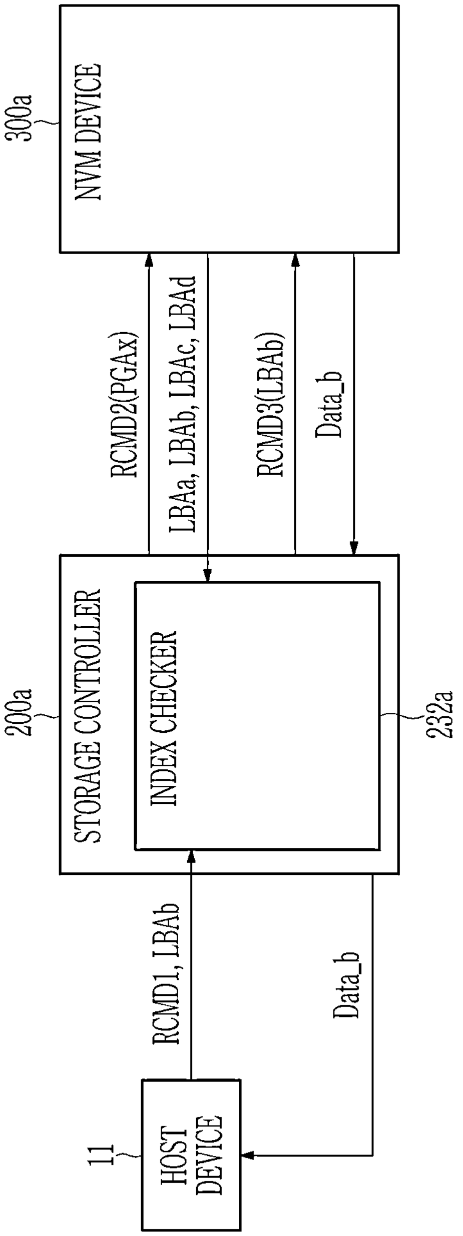
FIG. 11 is a view for explaining the operation of the storage device according to some example embodiments.

FIG. 10 is a ladder diagram for explaining an operation of the storage device according to some example embodiments. FIG. 11 is a view for explaining the operation of the storage device according to some example embodiments. FIG. 10 and FIG. 11 are views for explaining a read operation on the storage device according to some example embodiments.

Referring to FIG. 1 to FIG. 4, FIG. 6, FIG. 10, and FIG. 11, the host device 11 provides a first read command RCMD1 to the storage controller 200*a* (S210).

During a read operation on the storage device 100, the host device 11 may provide a b-th logical block address LBAb corresponding to a first address ADDR1, together with the first read command RCMD1 corresponding to a first command CMD1, to the storage controller 200*a*.

On the basis of the first read command RCMD1, the storage controller 200*a* provides a second read command RCMD2 to the non-volatile memory device 300*a* (S220).

During the read operation on the storage device 100, the storage controller 200*a* may provide an x-th physical group address PGAx corresponding to a second address ADDR2, together with the second read command RCMD2 corresponding to a second command CMD2, to the non-volatile memory device 300*a*.

The FTL 230*a* may translate a b-th logical block address LBAb provided from the host device 11 to an x-th physical group address PGAx on the basis of the mapping table (MT) 231*a*. On the basis of the second read command RCMD2, the storage controller 200*a* may request the non-volatile memory (NVM) device 300*a* to perform a read operation on metadata at the x-th physical group address PGAx.

The non-volatile memory device 300*a* performs a first read operation READ1 based on the physical group address PGA provided in the second read command RCMD2 (S230).

The non-volatile memory device 300*a* may perform an operation of sequentially reading a-th to d-th metadata MDa to MDd at the x-th physical group address PGAx, and may sequentially read a-th to d-th logical block addresses LBNa to LBNd contained in the a-th to d-th metadata MDa to MDd, respectively.

The non-volatile memory device 300*a* provides the plurality of metadata MD corresponding to the physical group address PGA, to the storage controller 200*a* (S240).

The non-volatile memory device 300*a* may provide the read a-th to d-th metadata MDa to MDd to the storage controller 200*a*, and the non-volatile memory device 300*a* may provide the a-th to d-th logical block addresses LBNa to LBNd contained in the a-th to d-th metadata MDa to MDd, to the storage controller 200*a*.

The storage controller 200*a* performs an index checking operation on the plurality of metadata MD (S250).

For example, the storage controller 200*a* may set the b-th logical block address LBAb provided from the host device 11, as a reference index, by the index checker 232*a*, and compare it with the a-th to d-th logical block addresses LBNa to LBNd provided from the non-volatile memory device 300*a*. Depending on the comparison result, the storage controller 200*a* may select the matched b-th logical block address LBNb from the a-th to d-th logical block addresses LBNa to LBNd.

On the basis of the index checking operation, the storage controller 200*a* provides a third read command RCMD3 to the non-volatile memory (NVM) device 300*a* (S260).

On the basis of the selected b-th logical block address LBNb, the storage controller 200*a* may provide a third read command RCMD3 for the b-th data Data_b to the non-volatile memory (NVM) device 300*a*.

The non-volatile memory device 300*a* performs a second read operation READ2 based on the third read command RCMD3 (S270). The non-volatile memory device 300*a* may read the b-th data Data_b on the basis of the b-th metadata MDb containing the b-th logical block address LBNb.

The non-volatile memory device 300*a* provides the data read in the second read operation READ2, to the storage controller 200*a* (S280). The non-volatile memory device 300*a* may provide the read b-th data Data_b to the storage controller 200*a*.

The storage controller 200*a* provides the data provided from the non-volatile memory device 300*a* to the host device 11 (S290). The storage controller 200*a* may provide the b-th data Data_b read on the basis of the first read command RCMD1 provided from the host device 11 and the b-th logical block address LBNb, to the host device 11.

Figure 12:
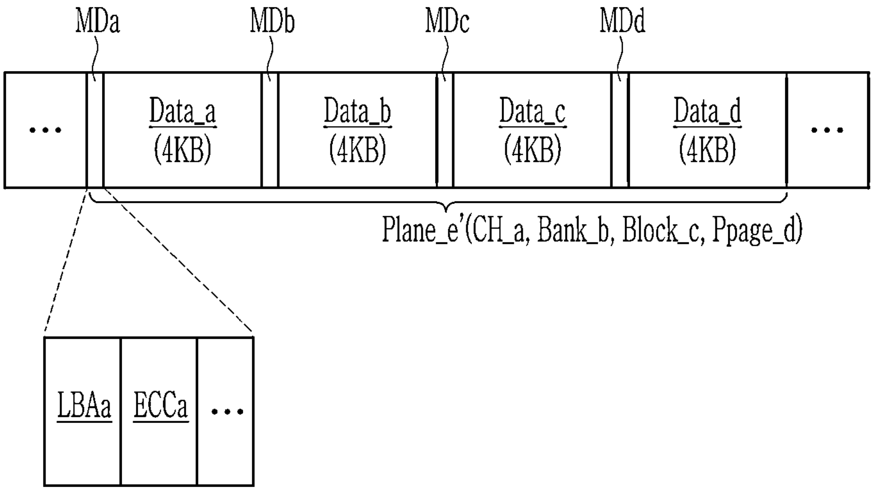
FIG. 12 is a view visually illustrating data stored in a non-volatile memory device according to some example embodiments.

FIG. 12 is a view visually illustrating data stored in a non-volatile memory device according to some example embodiments. FIG. 12 shows another example of the layout of data stored in one plane in a physical page of the non-volatile memory device. An e-th plane Plane_e' in FIG. 12 may correspond to the e-th plane Plane_e illustrated in FIG. 6. For ease of explanation, the differences between the two will be described, and the common points will not be described.

Referring to FIG. 6 and FIG. 12, memory cells corresponding to the e-th plane Plane_e' may store a-th to d-th metadata MDa to MDd and a-th to d-th data Data_a to Data_d corresponding to the a-th to d-th metadata MDa to MDd.

The a-th metadata MDa, the a-th data Data_a, the b-th metadata MDb, the b-th data Data_b, the c-th metadata MDc, the c-th data Data_c, the d-th metadata MDd, and the d-th data Data_d may be written in the listed order in the e-th plane Plane_e' without separate spare areas SPA and data areas DTA.

Accordingly, when the non-volatile memory device 300*a* in FIG. 4 sequentially reads the e-th plane Plane_e', the a-th metadata MDa, the a-th data Data_a, the b-th metadata MDb, the b-th data Data_b, the c-th metadata MDc, the c-th data Data_c, the d-th metadata MDd, and the d-th data Data_d may be sequentially provided in the listed order to the storage controller 200*a* in FIG. 2.

Figure 13:
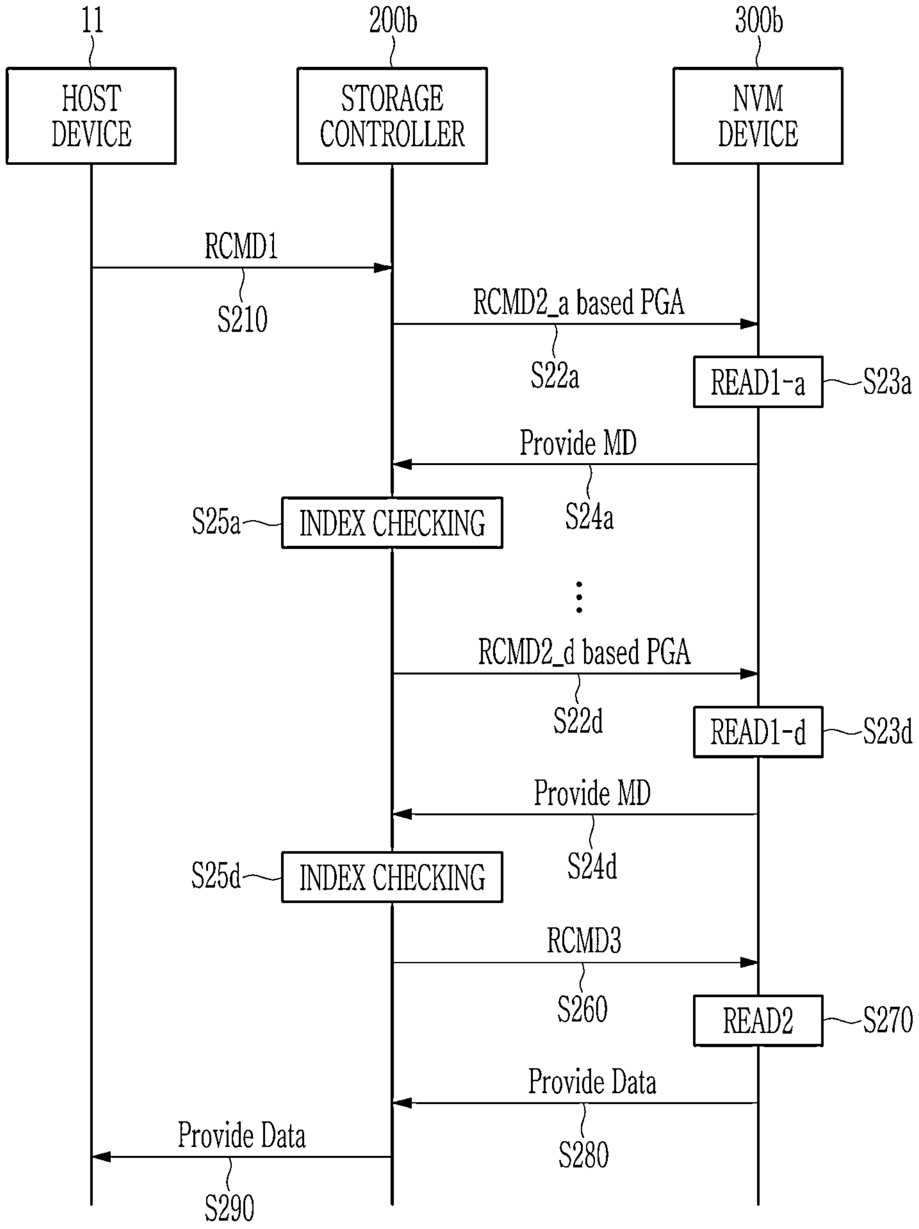
FIG. 13 and FIG. 14 are views for explaining an operation of the storage device according to some example embodiments.
Figure 14:
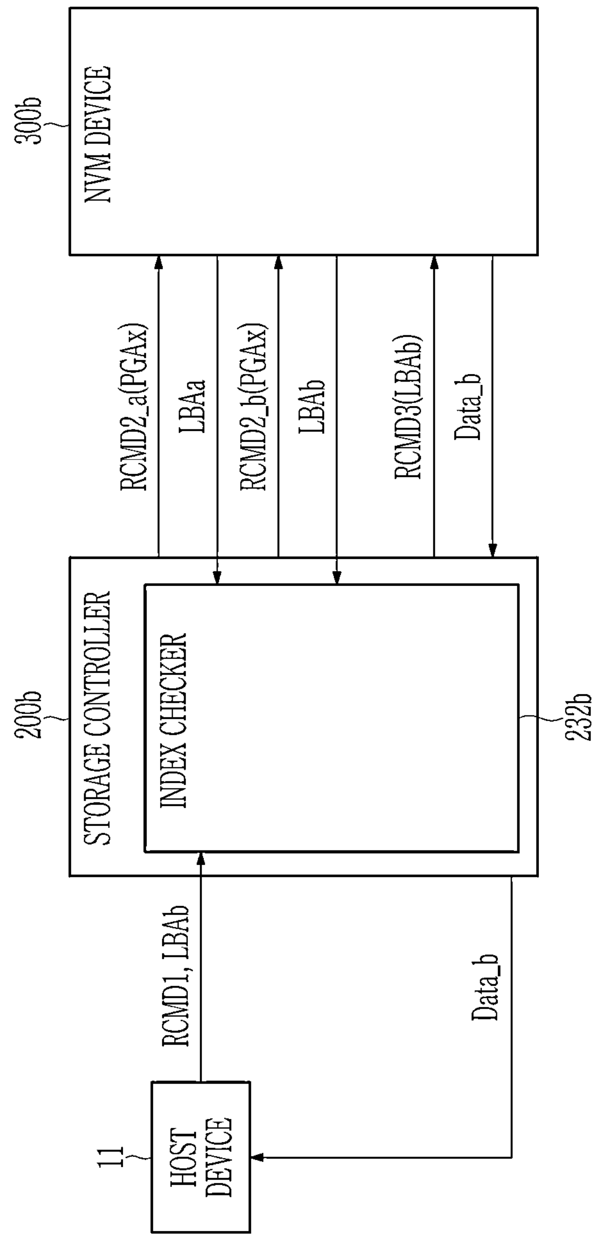

FIG. 13 is a ladder diagram for explaining an operation of the storage device according to some example embodiments. FIG. 14 is a view for explaining the operation of the storage device according to some example embodiments. FIG. 13 and FIG. 14 are views for explaining a read operation on a storage device including the e-th plane Plane_e' in FIG. 12. A storage controller 200*b* and a non-volatile memory device 300*b* illustrated in FIG. 12 to FIG. 14 are components corresponding to the storage controller 200*a* and the non-volatile memory device 300*a* illustrated in FIG. 2 to FIG. 11. For ease of explanation, the storage controller 200*b* and the non-volatile memory device 300*b* will be described with a focus on the operation differences from the storage controller 200*a* and the non-volatile memory device 300*a*, and the common points will not be described.

Referring to FIG. 1 to FIG. 4, FIG. 12, FIG. 13, and FIG. 14, the host device 11 provides a first read command RCMD1 to the storage controller 200*b* (S210).

During a read operation on the storage device 100, the host device 11 may provide a b-th logical block address LBAb corresponding to a first address ADDR1, together with the first read command RCMD1 corresponding to a first command CMD1, to the storage controller 200*b*.

On the basis of the first read command RCMD1, the storage controller 200*b* provides a 2_*a*-th read command RCDM2_*a* to the non-volatile memory device 300*b* (S22*a*).

During the read operation on the storage device 100, the storage controller 200*b* may provide an x-th physical group address PGAx corresponding to a second address ADDR2, together with a 2_*a*-th read command RCDM2_*a* corresponding to a second command CMD2, to the non-volatile memory device 300*b*.

The non-volatile memory device 300*b* performs a 1_*a*-th read operation READ1-*a* based on the provided physical group address PGA (S23*a*).

The non-volatile memory device 300*b* may perform a read operation by randomly accessing any one piece of metadata of the a-th to d-th metadata MDa to MDd at the x-th physical group address PGAx, and may read any one logical block address of the a-th to d-th logical block addresses LBNa to LBNd contained in the randomly accessed metadata.

The non-volatile memory device 300*b* provides a piece of metadata MD corresponding to the physical group address PGA, to the storage controller 200*b* (S24*a*).

The non-volatile memory device 300*b* may provide the read metadata to the storage controller 200*b*, and the non-volatile memory device 300*b* may provide any one logical block address.

The storage controller 200*b* performs an index checking operation on the single piece of metadata MD (S25*a*).

The storage controller 200*b* may compare the logical block address LBA provided from the host device 11 and the logical block address provided from the non-volatile memory device 300*b* by the index checker 232*a*. When the comparison result represents that the two logical block addresses match each other, the storage controller 200*b* may select the provided metadata.

When the comparison result represents that the two logical block addresses do not match each other, the storage controller 200*b* and the non-volatile memory device 300*b* may repeatedly perform steps S22*a* to S25*a* and steps S22*d* to S25*d* corresponding thereto.

Referring to FIG. 14 as an example, the storage controller 200*b* may set the b-th logical block address LBAb provided from the host device 11, as a reference index, and perform an index checking operation.

The storage controller 200*b* may provide an x-th physical group address PGAx together with the 2_*a*-th read command RCDM2_*a* to the non-volatile memory device 300*b*, and the non-volatile memory device 300*b* may perform a read operation by randomly accessing the a-th logical block address LBAa among the plurality of logical block addresses LBAa to LBAd on the basis of the provided x-th physical group address PGAx, and provide the a-th logical block address LBAa to the storage controller 200*b*.

The storage controller 200*b* may compare the b-th logical block address LBAb provided from the host device 11 and the a-th logical block address LBAa provided from the non-volatile memory device 300*b*, and may not select the unmatched a-th logical block address LBAa.

Thereafter, the storage controller 200*b* may provide an x-th physical group address PGAx together with a 2_*b*-th read command RCDM2_*b* to the non-volatile memory device 300*b*, and the non-volatile memory device 300*b* may perform a read operation by randomly accessing the b-th logical block address LBAb among the plurality of logical block addresses LBAa to LBAd on the basis of the provided x-th physical group address PGAx. The non-volatile memory device 300*b* may provide the read b-th logical block address LBAb to the storage controller 200*b*.

The storage controller 200*b* may compare the b-th logical block address LBAb provided from the host device 11 and the b-th logical block address LBAb provided from the non-volatile memory device 300*b*, and select the matched b-th logical block address LBAb.

The storage controller 200*b* may provide a third read command RCMD3 for the b-th data Data_b to the non-volatile memory device 300*b*, on the basis of the selected b-th logical block address LBAb.

Figure 15:
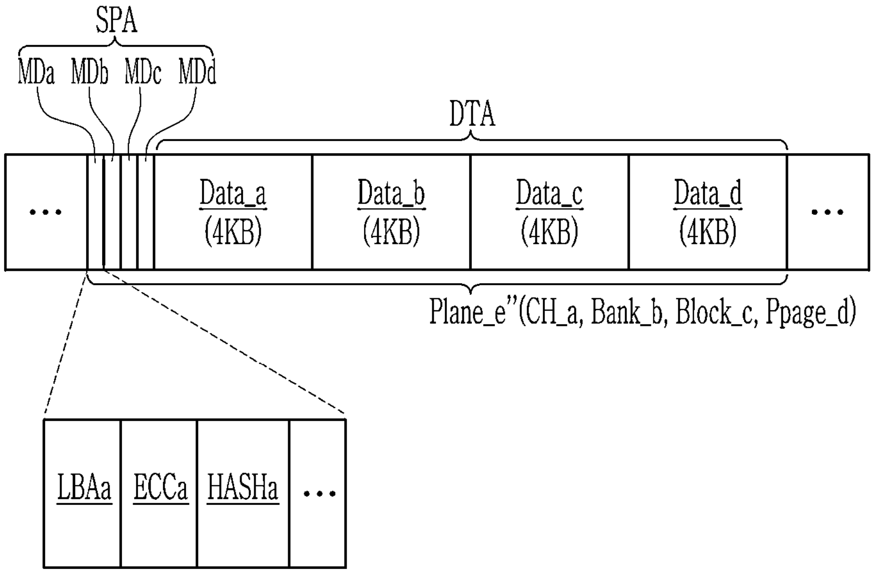
FIG. 15 is a view visually illustrating data stored in a non-volatile memory device according to some example embodiments.

FIG. 15 is a view visually illustrating data stored in a non-volatile memory device according to some example embodiments. FIG. 15 shows yet another example of the layout of data stored in one plane in a physical page of the non-volatile memory device. An e-th plane Plane_e" in FIG. 15 may correspond to the e-th plane Plane_e illustrated in FIG. 6. For ease of explanation, the differences between the two will be described, and the common points will not be described.

Referring to FIG. 6 and FIG. 15, memory cells corresponding to the e-th plane Plane_e" may store a-th to d-th metadata MDa to MDd and a-th to d-th data Data_a to Data_d corresponding to the a-th to d-th metadata MDa to MDd.

In some example embodiments, the a-th to d-th metadata MDa to MDd may contain hash data together with the logical block addresses LBA and ECC (error correction code) data of the a-th to d-th data Data_a to Data_d. Hash data may be a predetermined number of bits of data indicating location information on subject data, and may be data capable of specifying an address among a group of addresses after translation to a physical group address, in some example embodiments.

For example, the a-th metadata MDa may contain the a-th logical block address LBAa, the a-th ECC data ECCa, and a-th hash data HASHa corresponding to the a-th data Data_a. The a-th hash data HASHa may be data for specifying the a-th data Data_a which is the subject of the a-th metadata MDa among the a-th to d-th data Data_a to Data_d corresponding to the same physical group address PGA, and may be a predetermined number of bits of data. The description of the a-th metadata MDa may be applied to the rest of the a-th to d-th metadata MDa to MDd.

Figure 16:
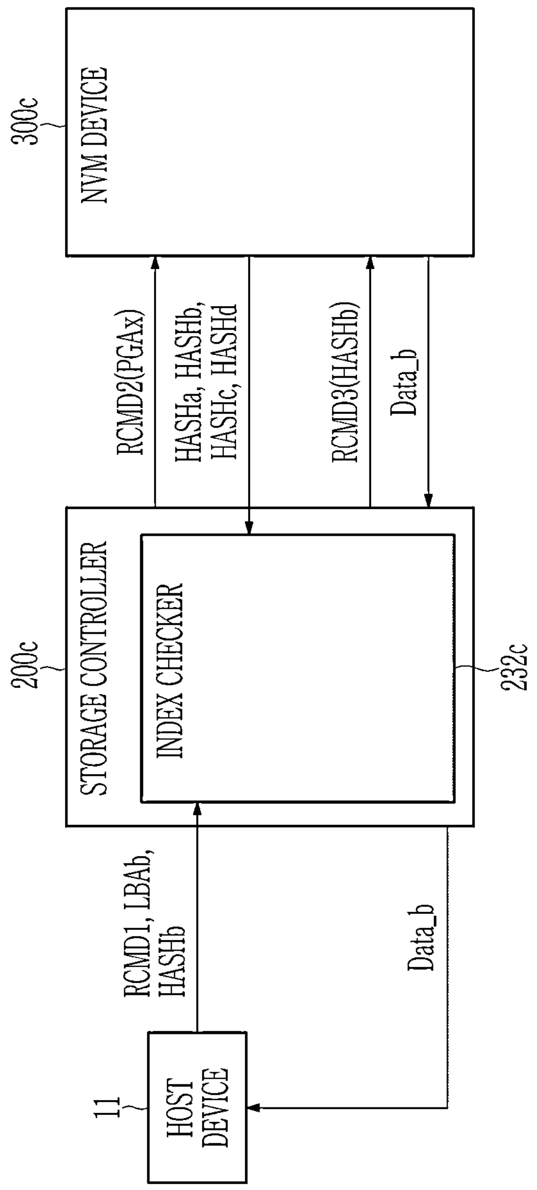
FIG. 16 is a view for explaining an operation of the storage device according to some example embodiments.

FIG. 16 is a view for explaining an operation of the storage device according to some example embodiments. FIG. 16 is a view for explaining a read operation on the storage device including the e-th plane Plane_e" illustrated in FIG. 15. A storage controller 200*c* and a non-volatile memory device 300*c* illustrated in FIG. 16 are components corresponding to the storage controller 200*a* and the non-volatile memory device 300*a* illustrated in FIG. 2 to FIG. 11. For ease of explanation, the storage controller 200*c* and the non-volatile memory device 300*c* will be described with a focus on the operation differences from the storage controller 200*a* and the non-volatile memory device 300*a*, and the common points will not be described.

Referring to FIG. 11, FIG. 15, and FIG. 16, during a read operation on the storage device, the host device 11 may provide a b-th logical block address LBAb and a b-th hash data HASHb, together with a first read command RCMD1, to the storage controller 200*c*.

On the basis of the first read command RCMD1, the storage controller 200*c* may provide an x-th physical group address PGAx together with a second read command RCMD2 to the non-volatile memory device 300*c*.

The non-volatile memory device 300*c* may perform an operation of sequentially reading a-th to d-th metadata MDa to MDd at the x-th physical group address PGAx, and may sequentially read a-th to d-th hash data HASHa to HASHd contained in the a-th to d-th metadata MDa to MDd, respectively.

The non-volatile memory device 300*c* may provide the read a-th to d-th hash data HASHa to HASHd to the storage controller 200*c*.

As shown in FIG. 14, the storage controller 200*c* may set the b-th hash data HASHb provided from the host device 11 as a reference index by the index checker 232*c*, and compare it with the a-th to d-th hash data HASHa to HASHd provided from the non-volatile memory device 300*c*. Depending on the comparison result, the storage controller 200*c* may select the matched b-th hash data HASHb among the a-th to d-th hash data HASHa to HASHd.

On the basis of the selected b-th hash data HASHb, the storage controller 200*c* may provide a third read command RCMD3 for the b-th data Data_b to the non-volatile memory device 300*c*.

On the basis of the b-th metadata MDb including the b-th hash data HASHb, the non-volatile memory device 300*c* may read the b-th data Data_b and provide the read b-th data Data_b to the storage controller 200*c*.

The storage controller 200*c* may provide the b-th data Data_b read on the basis of the first read command RCMD1, the b-th logical block address LBAb, and the b-th hash data HASHb provided from the host device 11, to the host device 11.

Figure 17:
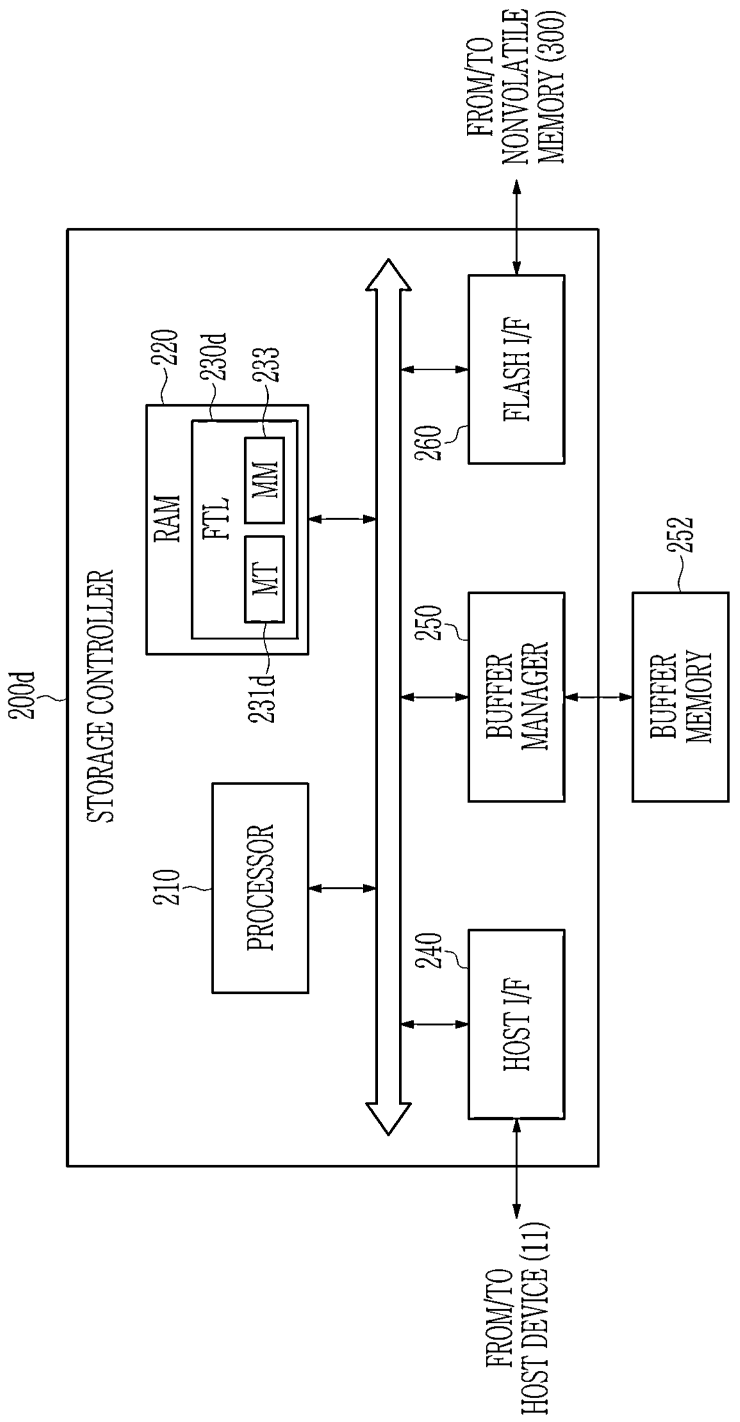
FIG. 17 and FIG. 18 are views for explaining a storage device according to some example embodiments.
Figure 18:
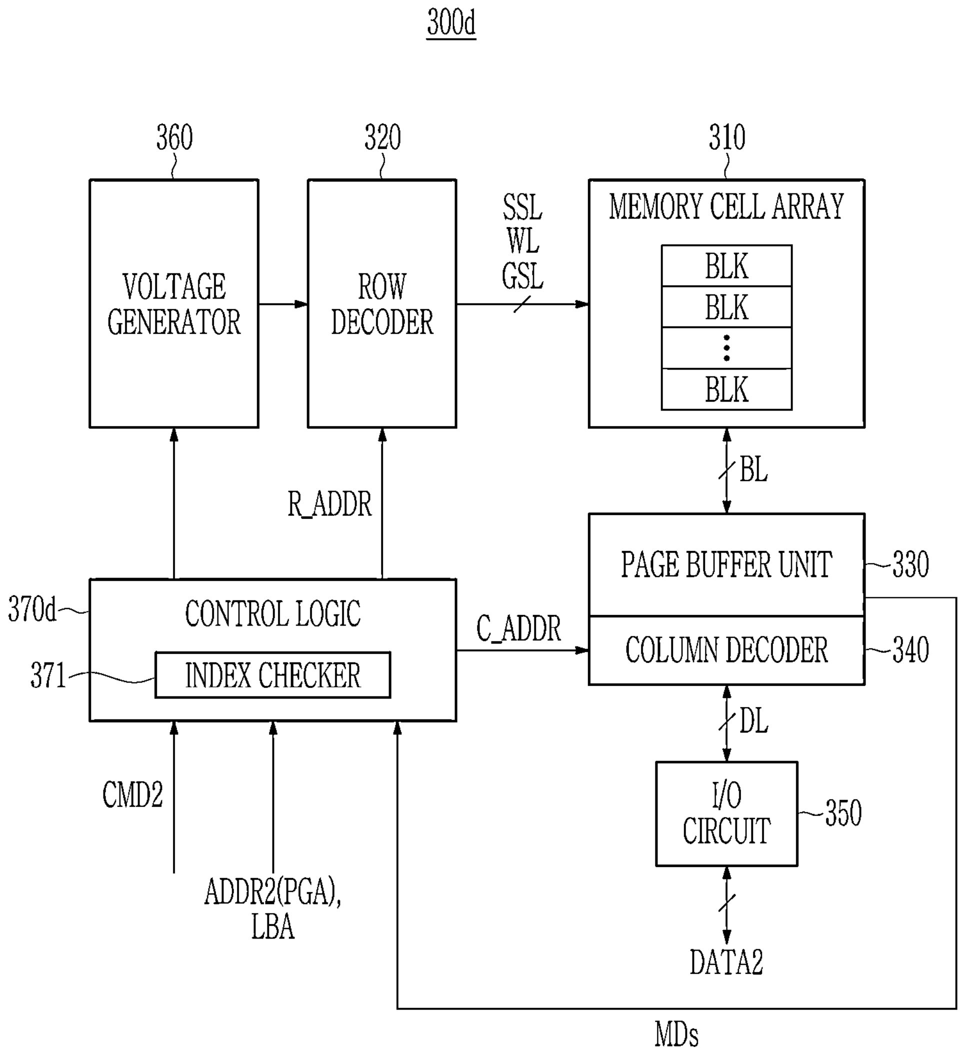

FIG. 17 and FIG. 18 are views for explaining a storage device according to some example embodiments. A storage controller 200*d* illustrated in FIG. 17 is a component corresponding to the storage controller 200*a* illustrated in FIG. 2, and a non-volatile memory device 300*d* illustrated in FIG. 18 is a component corresponding to the non-volatile memory device 300*a* illustrated in FIG. 4, and an index checker 371 illustrated in FIG. 18 and the index checker 232*a* illustrated in FIG. 2 are components corresponding to each other. For ease of explanation, the storage controller 200*d*, the non-volatile memory device 300*d*, and the index checker 371 illustrated in FIG. 17 and FIG. 18 will be described with a focus on the differences from the storage controller 200*a*, the non-volatile memory device 300*a*, and the index checker 232*a* illustrated in FIG. 2 and FIG. 4, and the common points will not be described.

Referring to FIG. 2, FIG. 4, FIG. 17, and FIG. 18, a control logic 370*d* of the non-volatile memory device 300*d* may include the index checker 371. The index checker 371 may be implemented with software on the control logic 370*d* so as to perform functions; however, in some example embodiments, the index checker 371 may be implemented with hardware in the control logic 370*d*.

The storage controller 200*d* may provide the logical block address LBA and the physical group address PGA provided from the host device 11 to the control logic 370*d* in the non-volatile memory device 300*d*.

On the basis of the physical group address PGA, a plurality of metadata MDs read by the page buffer unit 330 may be provided to the index checker 371 of the control logic 370*d*.

The control logic 370*d* may control other components in the non-volatile memory device 300*d* such that they read data corresponding to any one piece of metadata of the plurality of metadata MDs through the index checker 371.

Figure 19:
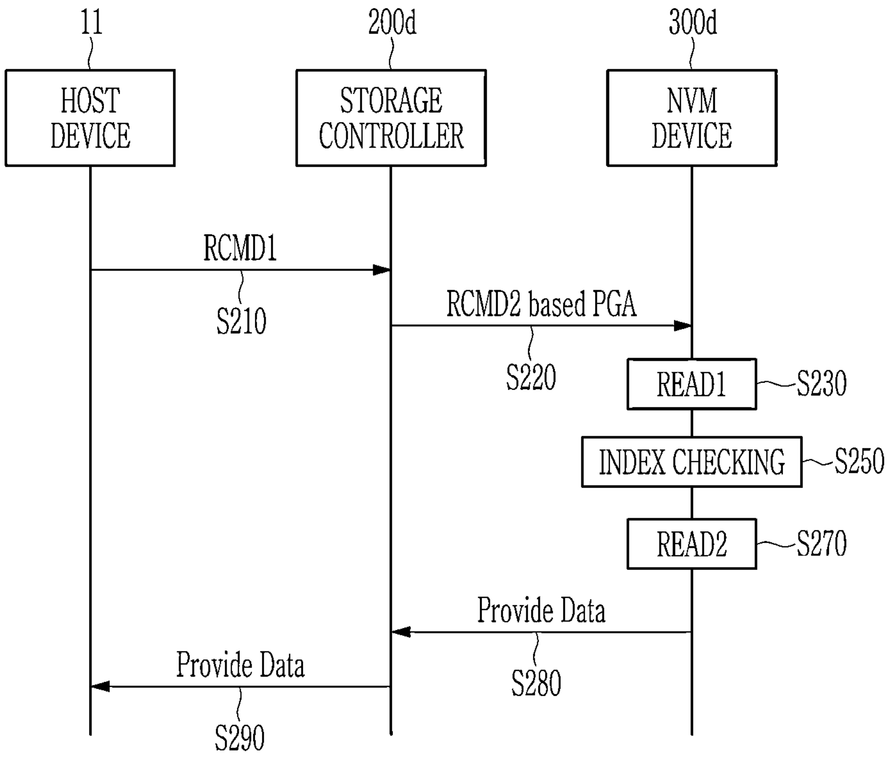
FIG. 19 is a ladder diagram for explaining the operation of an electronic system according to some example embodiments.

FIG. 19 is a ladder diagram for explaining the operation of an electronic system according to some example embodiments. FIG. 19 is a view for explaining a read operation of the storage controller 200*d* illustrated in FIG. 17 on the non-volatile memory device 300*d* illustrated in FIG. 18. A read operation of the storage controller 200*d* on the non-volatile memory device 300*d* will be described with a focus on the differences from the read operation of the storage controller 200*a* on the non-volatile memory device 300*a* shown in FIG. 10.

Referring to FIG. 2, FIG. 4, FIG. 10, and FIG. 17 to FIG. 19, the host device 11 provides a first read command RCMD1 to the storage controller 200*d* (S210). On the basis of the first read command RCMD1, the storage controller 200*d* provides a second read command RCMD2 to the non-volatile memory device 300*d* (S220).

The storage controller 200*d* may provide a physical group address PGA corresponding to a second address ADDR2 and a logical block address LBA provided together with the first read command RCMD1, together with the second read command RCMD2, to the non-volatile memory device 300*d* (S220).

An FTL 230*d* may translate the logical block address LBA provided from the host device 11 to a physical group address PGA on the basis of a mapping table (MT) 231*d*, provide the physical group address PGA and the logical block address LBA to the non-volatile memory device 300*d*, and request a read operation.

The non-volatile memory device 300*d* performs a first read operation READ1 based on the provided physical group address PGA (S230).

The non-volatile memory device 300*d* may perform an operation of sequentially reading a plurality of metadata MD at the physical group address PGA, and may sequentially read the logical block addresses contained in the plurality of metadata MD, respectively.

The non-volatile memory device 300*d* performs an index checking operation on the plurality of metadata MD (S250).

The control logic 370*d* may set the logical block address LBA provided from the storage controller 200*d*, as a reference index, by the index checker 371, compare it with the plurality of provided metadata MD, and select a piece of metadata matching the reference index from among the plurality of metadata MD.

The non-volatile memory device 300*d* performs a second read operation READ2 based on the metadata selected in the above-mentioned operation S250 (S270). The control logic 370*d* may read data corresponding to the selected metadata.

The non-volatile memory device 300*d* provides the data read in the second read operation READ2 to the storage controller 200*d* (S280). The storage controller 200*d* provides the data, provided from the non-volatile memory device 300*d*, to the host device 11 (S290).

FIG. 20 is a view for explaining a storage device according to some example embodiments. FIG. 20 shows another example of the mapping table (MT) in the storage controller. A mapping table (MT) 231*e* illustrated in FIG. 20 may correspond to the mapping table (MT) 231*a* illustrated in FIG. 3. For ease of explanation, the differences between the two will be described, and the common points will not be described.

The mapping table (MT) 231*e* may contain a plurality of entries PTE. Each of the plurality of entries PTE may contain mapping information on the correspondence relationship between a logical block address LBA and a physical group address PGA. The plurality of entries PTE may include 1st to n-th entries PTE1 to PTEn.

The 1st entry PTE1 may include mapping information making a 1st logical block address LBA1 and a y-th physical group address PGAy correspond to each other. The y-th physical group address PGAy may contain information on the b-th bank Bank_b, information on the c-th block Block_c, information on the d-th physical page Ppage_d, information on the e-th plane Plane_e, and information on an a-th page index PPI_a in the non-volatile memory device 300.

The 2nd entry PTE2 may contain mapping information making a 2nd logical block address LBA2 and the y-th physical group address PGAy correspond to each other. The n-th entry PTEn may contain mapping information making an n-th logical block address LBAn and the y-th physical group address PGAy correspond to each other.

The physical group address PGAy illustrated in FIG. 20 may be assigned to a group, and may have a one-to-many relationship with a plurality of minimum physical address units through different channels. Accordingly, the number of bits (BITNUM) that is assigned to the physical group address PGAy in the mapping information may be smaller than the number of bits representing the minimum physical address unit.

Figure 21:
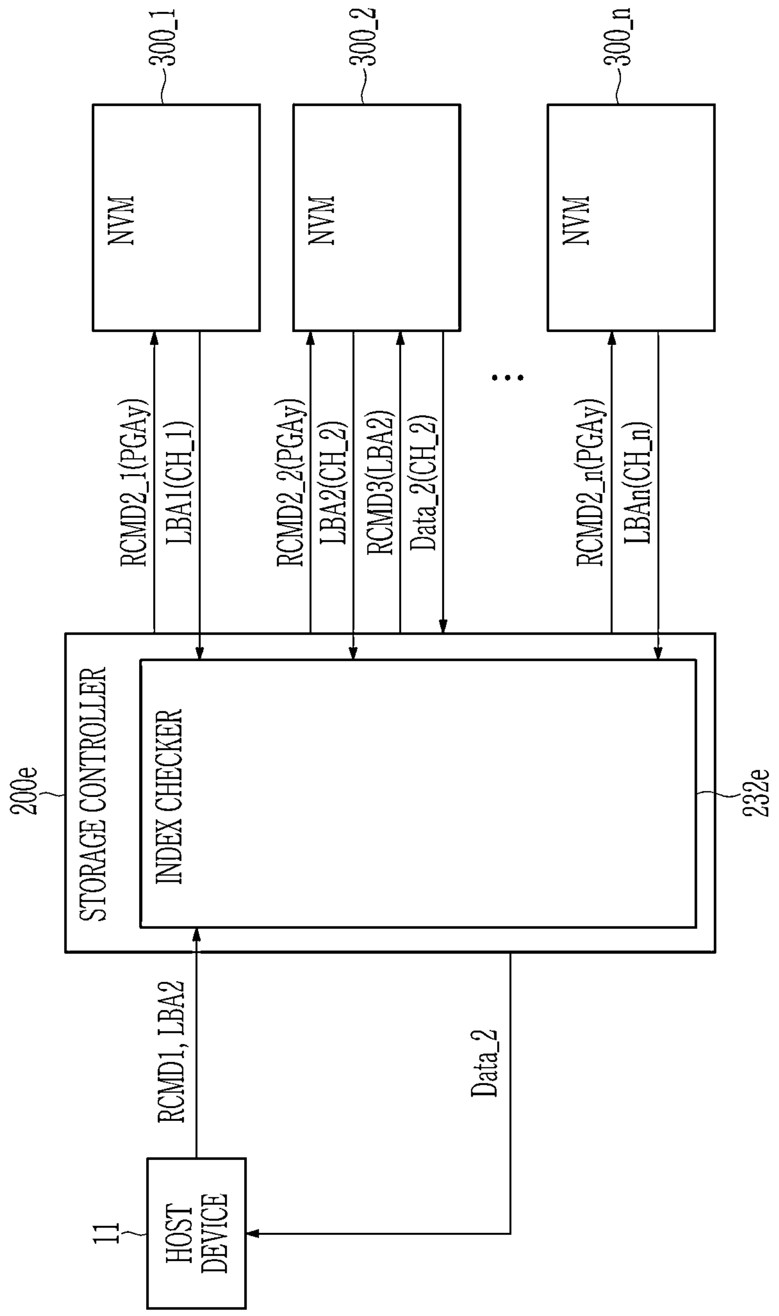
FIG. 21 is a view for explaining the operation of a storage device according to some example embodiments.

FIG. 21 is a view for explaining the operation of a storage device according to some example embodiments. FIG. 21 is a view for explaining a read operation on a storage device including the mapping table 231*e* illustrated in FIG. 20. A storage controller 200*e* and the plurality of non-volatile memories 300_1, 300_2, . . . , 300_*n* illustrated in FIG. 21 are components corresponding to the storage controller 200*a* and the non-volatile memory device 300*a* illustrated in FIG. 2 to FIG. 11. For ease of explanation, operation differences in the storage controller 200*e* and the plurality of non-volatile memories 300_1, 300_2, . . . , 300_*n* will be mainly described, and the common points will not be described.

Referring to FIG. 11, FIG. 20, and FIG. 21, the storage controller 200*e* may be coupled to the plurality of non-volatile memories 300_1, 300_2, . . . , 300_*n* through the plurality of channels CH_1, CH_2, . . . , CH_n, respectively.

During a read operation on the storage device, the host device 11 may provide a 2nd logical block address LBA2 together with a first read command RCMD1 to the storage controller 200*e*.

On the basis of the first read command RCMD1, the storage controller 200*e* may provide a y-th physical group address PGAy together with a second read command RCMD2, in parallel to the plurality of non-volatile memories 300_1, 300_2, . . . , 300_*n* through the plurality of channels CH_1, CH_2, . . . , CH_n, respectively.

The plurality of non-volatile memories 300_1, 300_2, . . . , 300_*n* may perform read operations by randomly accessing logical block addresses LBA1, LBA2, LBAn in the y-th physical group address PGAy, respectively, and provide the logical block addresses LBA1, LBA2, . . . , LBAn to the storage controller 200*e*. The 1st logical block address LBA1 may be provided to the storage controller 200*e* through the 1st channel CH_1, and the 2nd logical block address LBA2 may be provided to the storage controller 200*e* through the 2nd channel CH_2, and the n-th logical block address LBAn may be provided to the storage controller 200*e* through the n-th channel CH_n.

As shown in FIG. 21, the storage controller 200*e* may set the 2nd logical block address LBA2 provided from the host device 11, as a reference index, by an index checker 232*e*, compare it with the logical block addresses LBA1, LBA2, . . . , LBAn provided from the plurality of non-volatile memories 300_1, 300_2, . . . , 300_*n*, and select the matched 2nd logical block address LBA2 from the logical block addresses LBA1, LBA2, . . . , LBAn.

On the basis of the selected 2nd logical block address LBA2, the storage controller 200*e* may provide a third read command RCMD3 for the second data DATA2 to the 2nd non-volatile memory 300_2.

The 2nd non-volatile memory 300_2 may read the second data DATA2 based on the selected 2nd logical block address LBA2, and provide the read second data DATA2 to the storage controller 200*e*.

The storage controller 200*e* may provide the first read command RCMD1 provided from the host device 11 and the second data DATA2 read based on the 2nd logical block address LBA2, to the host device 11.

In some example embodiments, the storage device may group the minimum physical address units, and assign physical group addresses to the groups, respectively. The physical group addresses can result in a decrease in the numbers of bits in the mapping table that are assigned to physical addresses, thereby reducing the amount of usage of the FTL in the RAM by the storage controller.

In some example embodiments, the storage device may use metadata of target data to be stored in the memory cell array, as a mapping index, to translate logical addresses to physical addresses, thereby reducing the numbers of bits in the mapping table that are assigned to physical addresses.

One or more of the elements disclosed above may include or be implemented in one or more processing circuitries such as hardware including logic circuits; a hardware/software combination such as a processor executing software; or a combination thereof. For example, the processing circuitries more specifically may include, but are not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

As described herein, any devices, electronic devices, modules, models, units, and/or portions thereof according to any of the example embodiments, and/or any portions thereof may include, may be included in, and/or may be implemented by one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), and the like. In some example embodiments, the processing circuitry may include a non-transitory computer readable storage device (e.g., a memory), for example a solid state drive (SSD), storing a program of instructions, and a processor (e.g., CPU) configured to execute the program of instructions to implement the functionality and/or methods performed by some or all of any devices, electronic devices, modules, units, and/or portions thereof according to any of the example embodiments.

Further, any memories described herein may be a non-volatile memory, such as a flash memory, a phase-change random access memory (PRAM), a magneto-resistive RAM (MRAM), a resistive RAM (ReRAM), or a ferro-electric RAM (FRAM), or a volatile memory, such as a static RAM (SRAM), a dynamic RAM (DRAM), or a synchronous DRAM (SDRAM).

While the present inventive concepts have been described in connection with some example embodiments, it is to be understood that the present inventive concepts are not limited to the disclosed example embodiments. On the contrary, the present inventive concepts are intended to cover various modifications and equivalent arrangements included within the spirit and scope of the appended claims.

What is claimed is:

1. A storage device comprising:

a non-volatile memory device configured to store data in a data area and metadata corresponding to the data in a spare area distinguished from the data area; and a memory controller configured to perform a translation operation of translating a logical address received from an outside to a physical group address, the physical group address being mapped to a plurality of logical addresses, the plurality of logical addresses including the logical address received from the outside, the physical group address being a single physical group address, receive first metadata and second metadata different from each other from the non-volatile memory device based on the physical group address, and perform an index check operation of selecting a piece of the metadata corresponding to the logical address from the first metadata and the second metadata.

2. The storage device of claim 1, wherein the memory controller is configured to send a read command for the data corresponding to the piece of the metadata selected from the first metadata and the second metadata, to the non-volatile memory device.

3. The storage device of claim 1, wherein the physical group address corresponds to a first plane of the non-volatile memory device.

4. The storage device of claim 3, wherein the physical group address contains channel information, bank information, block information, physical-page information, and plane information on the first plane.

5. The storage device of claim 3, wherein the non-volatile memory device is configured to store first data corresponding to the first metadata and second data corresponding to the second metadata, and perform a sequential write operation on the first plane in an order of the first metadata, the second metadata, and the first data.

6. The storage device of claim 5, wherein the memory controller is configured to perform a check operation on the first metadata after a read operation on the first metadata and the second metadata.

7. The storage device of claim 1, wherein the physical group address contains bank information, block information, physical-page information, plane information, and index information.

8. The storage device of claim 7, wherein the memory controller is configured to receive the first metadata through a first channel, and receive the second metadata through a second channel different from the first channel.

9. The storage device of claim 1, wherein the first metadata contains a first logical block address, and the index check operation includes comparing the logical address and the first logical block address.

10. The storage device of claim 1, wherein the memory controller is configured to receive hash data corresponding to the logical address, from the outside, the first metadata contains first hash data, and the index check operation includes comparing the hash data and the first hash data.

11. A storage device comprising:

a non-volatile memory device configured to store first data, first metadata corresponding to the first data, second data different from the first data, and second metadata corresponding to the second data; and a memory controller that includes a flash translation layer containing first mapping information in which a first logical address corresponding to the first metadata and a physical group address are mapped with each other and second mapping information in which a second logical address corresponding to the second metadata and the physical group address are mapped with each other, the physical group address being mapped to a plurality of logical addresses, the plurality of logical addresses including the first logical address and the second logical address, the physical group address being a single physical group address.

12. The storage device of claim 11, wherein the non-volatile memory device is configured to receive the physical group address from the memory controller, read the first metadata and the second metadata based on the physical group address, perform an index check operation of selecting the first metadata and the second metadata based on a logical address provided from an outside, and send one of the first data and the second data to the memory controller based on the index check operation.

13. The storage device of claim 12, wherein the non-volatile memory device includes a control logic that is configured to perform the index check operation.

14. The storage device of claim 13, wherein the control logic is configured to receive the logical address, and perform the index check operation based on the logical address.

15. The storage device of claim 11, wherein the memory controller is configured to receive the first metadata and the second metadata based on the first mapping information and the second mapping information, and perform an index check operation of selecting the first metadata and the second metadata based on a logical address received from an outside, and the non-volatile memory device is configured to send one of the first data and the second data to the memory controller based on the index check operation.

16. The storage device of claim 15, wherein when performing a read operation on the first data, the memory controller is configured to perform an index check operation on the first metadata between a read operation on the first metadata and a read operation on the second metadata.

17. The storage device of claim 15, wherein the physical group address corresponds to a first plane of the non-volatile memory device, and when a sequential write operation on the first plane is performed, the sequential write operation is performed in an order of the first metadata, the first data, and the second metadata.

18. The storage device of claim 15, wherein the memory controller is configured to send a read command based on the index check operation.

19. An electronic system comprising:

a host device configured to send a read command and a logical address; and a storage device configured to receive the read command and the logical address, translate the logical address to a physical group address, the physical group address being mapped to a plurality of logical addresses, the plurality of logical addresses including the logical address, the physical group address being a single physical group address, read a plurality of logical block addresses stored in advance in association with the physical group address, in response to the read command, and send data corresponding to one logical block address corresponding to the logical address among the plurality of logical block addresses, to the host device.

20. The electronic system of claim 19, wherein a size of the data is 4 kB.

* * * * *